(12) United States Patent
Paluch et al.

(10) Patent No.: US 6,663,134 B2
(45) Date of Patent: Dec. 16, 2003

(54) PLANTER HITCH APPARATUS

(75) Inventors: Paul M. Paluch, Downers Grove, IL (US); James G. Jamilosa, Bolingbrook, IL (US); Geoffrey E. Cherry, Chicago, IL (US)

(73) Assignee: Case, LLC, Racine, WI (US)

( * ) Notice: Subject to any disclaimer, the term of this patent is extended or adjusted under 35 U.S.C. 154(b) by 38 days.

(21) Appl. No.: 10/062,612

(22) Filed: Jan. 31, 2002

(65) Prior Publication Data

US 2003/0141697 A1 Jul. 31, 2003

(51) Int. Cl.[7] .............................................. B60D 1/155
(52) U.S. Cl. ..................... 280/491.2; 172/272; 172/439
(58) Field of Search .......................... 280/491.2, 504; 172/272, 274, 275, 439, 47

(56) References Cited

U.S. PATENT DOCUMENTS

| | | | | |
|---|---|---|---|---|
| 2,590,218 A | * | 3/1952 | Steil | 280/515 |
| 3,384,937 A | * | 5/1968 | Muncke et al. | 280/482 |
| 4,723,787 A | * | 2/1988 | Hadley et al. | 172/311 |
| 4,799,711 A | * | 1/1989 | Moore | 280/444 |
| 5,113,956 A | | 5/1992 | Friesen et al. | 172/311 |
| 5,346,245 A | * | 9/1994 | Budrow et al. | 280/655 |
| 5,488,996 A | * | 2/1996 | Barry et al. | 172/311 |
| 5,580,088 A | | 12/1996 | Griffith | 280/479.2 |
| 5,829,497 A | * | 11/1998 | Maroney | 144/24.12 |
| 5,845,921 A | * | 12/1998 | Stimac | 280/479.3 |
| 5,957,477 A | * | 9/1999 | Ensz et al. | 280/482 |
| 6,202,756 B1 | | 3/2001 | Hundeby et al. | 172/311 |
| 6,209,657 B1 | | 4/2001 | Friggstad | 172/322 |
| 6,213,034 B1 | | 4/2001 | Raducha et al. | 111/57 |
| 6,273,449 B1 | | 8/2001 | Harkcom et al. | 280/491.3 |
| 6,293,352 B1 | | 9/2001 | Hundeby et al. | 172/456 |
| 6,374,921 B1 | | 4/2002 | Friggstad | 172/311 |
| 6,374,923 B1 | | 4/2002 | Friggstad | 172/383 |

FOREIGN PATENT DOCUMENTS

WO  WO 8910853 A1 * 11/1989 ........... B60D/01/14

OTHER PUBLICATIONS

Kinze Reference (Model 2600, Twin Line Planter, Operator & Parts Manual, MO159, Rev. 1/97, p. 28–32.

* cited by examiner

*Primary Examiner*—Paul N. Dickson
*Assistant Examiner*—Laura B. Rosenberg
(74) *Attorney, Agent, or Firm*—Rebecca Henkel

(57) ABSTRACT

An apparatus for securing an agricultural implement to a hitch receiving member of a vehicle including at least first, second and third tongue members where each tongue member forms a passageway and the members are arranged in a telescoping fashion where the second member is received within the first member passageway and the third member is received in the second member passageway, the apparatus also including at least first and second hydraulic cylinders for extending the second and third members from the first and second member passageways, respectively, wherein at least one of the cylinders is mounted externally of the members and the other cylinder may be mounted either internally or externally and including a single stage locking mechanism for locking stage members in each of the extended and retracted positions.

25 Claims, 24 Drawing Sheets

PLANTER HITCH APPARATUS

CROSS-REFERENCE TO RELATED APPLICATIONS

Not applicable.

FIELD OF THE INVENTION

The present invention relates generally to agricultural equipment and more specifically to an extendable multi-stage hitch assembly for linking an agricultural implement to a prime mover.

BACKGROUND OF THE INVENTION

Various types of agricultural implements have been developed that can be linked via an implement tongue member to a tractor hitch or other type of prime mover to facilitate different tasks including, for example, seeding, fertilizing and tilling. While there are many different factors that have to be considered when assessing the value of a particular implement, one relatively important factor is how quickly the implement can accomplish the task that the implement has been designed to facilitate. One way to increase task speed has been to increase implement width thereby reducing the number of passes required to perform the implement's task for an entire field. Thus, for instance, doubling the width of a seeding implement generally reduces the time required to completely seed a field by half.

With the development of modern high-powered tractors and implements, many implements extend to operating field widths of 40 feet or more. Hereinafter when an implement is extended into an operating configurations to accomplished specific tasks (e.g., seeding, tilling, etc.), the implement will be said to be in an operating position and have an operating width.

Unfortunately, while expansive implement operating widths are advantageous for quickly accomplishing tasks, such expansive widths cannot be tolerated during implement transport and storage. With respect to transport, egresses to many fields are simply not large enough to accommodate transport of a 40 plus foot implement into and out of the fields. In addition, often buildings and fences obstruct passageways and therefore will not allow transport. Moreover, many farm fields are separated by several miles and farmers have to use commercial roadways to transport their implements to and from fields. Essentially all commercial roadways are not designed to facilitate wide implement transport.

Recognizing the need for expansive implement operating widths and relatively narrow transport widths, the industry has developed some solutions that facilitate both transport and operating widths. To this end, one solution has been to provide piece-meal implements that can be disassembled into separate sections and stacked on a wheel supported implement section or on a separate trailer for transport. Obviously this solution is disadvantageous as it requires excessive labor to assemble and disassemble the implements between transport and intended use and may also require additional equipment (e.g., an additional trailer).

Another solution has been to provide a folding implement configuration. For instance, in a "scissors type" configuration, where an implement chassis is supported by wheels, right and left implement bars are pivotally mounted to the chassis where each bar is moveable between an operating position extending laterally from the chassis and a transport position where the bar is forwardly swingable over the tongue member and supportable by the tongue member during transport. As another instance, "pivotal-type" configurations provide a single implement bar centrally mounted for pivotal movement on a wheel supported chassis where the single bar is pivotable about the mount so that half of the bar extends over the tongue member and is supportable thereby and the other half of the bar extends away from the tractor behind the chassis. In either of these scissors or pivotal configurations, the tongue member has to be long enough to accommodate half the implement bar length plus some clearance required to allow a tractor linked to the tongue member to turn left and right. Thus, for instance, where the implement operating width is 40 feet, the tongue member generally has to be greater than 20 feet long.

While task speed is one important criteria with which to judge implement value, one other important criteria is implement effectiveness and efficiency. In agricultural endeavors, perhaps the most important measure of effectiveness is yield per acre. For this reason, when seeding a field, a farmer wants to seed every possible square foot of the field and thereafter, when maintaining (i.e., tilling, fertilizing, etc.) and harvesting a field, the farmer wants to avoid destroying the plants in the field. To maximize field seeding, farmers typically travel along optimal field paths. For instance, to ensure that seed is planted along the entire edge of a field, a farmer typically starts seeding the field by first traveling around the edge of the field with a seeding implement at least once and often two or more times along adjacent consecutively smaller paths prior to traveling in parallel rows through the field. These field edge paths are generally referred to in the industry as headland passes. By performing one or more headland passes about a field edge prior to performing parallel passes, the farmer provides a space for turning the tractor and implement around between parallel passes while still covering the entire space along the field edge.

While headland passes increase overall field coverage, whenever a tractor is driven over field sections that have already been seeded, the tractor and implement wheels crush the seeds or growing plants that they pass over and therefore reduce overall field production (i.e., yield per acre). For this reason, as known in the industry, where possible, farmers routinely attempt to reduce the number of headland passes required in a field.

Unfortunately, the number of headland passes required to facilitate complete field coverage is related to the turning radius of a tractor and implement combination and the combination turning radius is directly related to the length of the tongue member between the implement and the tractor. Thus, for instance, where the tongue is six feet long the turning radius may require only one headland pass while a twenty foot long tongue may require two or more headland passes to facilitate complete coverage.

Recognizing that a short tongue during implement operation reduces the number of required headland passes and therefore increases efficiency and that a long tongue is desirable to accommodate pivotal and scissors type implement configurations, some industry members have developed staged tongue members that expand to accommodate implement transport and retract to provide a minimal turning radius during implement operation. One of these solutions provides a single stage telescoping tongue member including a first tongue member mounted to an implement chassis and a second tongue member that is telescopically received in the first tongue member. To facilitate expansion and retraction, a hydraulic cylinder is positioned within one of the first and second tongue members with a base member mounted to one of the tongue members and a rod secured to the other of the tongue members. With relatively large implements and tractors, the force required by the cylinder is relatively large. By placing the cylinder inside the tongue members, cylinder force is evenly distributed thereby reducing cylinder wear, reducing cylinder requirements and increasing the useful cylinder life cycle.

While better than non-telescoping tongue members, unfortunately, single stage members cannot telescope between optimal maximum and minimum lengths. For this reason, where single stage tongue members have been employed, either extended implement operating width has been minimized or extra headland passes have been used to accommodate a larger than optimum turning radius.

One other solution has been to provide a multi-stage tongue member that is able to telescope between optimal maximum and minimum lengths. Designing workable multi-stage tongue assemblies, however, has proven to be a difficult task. To this end, a separate cylinder is required for each stage in a multi-stage assembly. For instance, in a two stage assembly at least two cylinders are required. Unfortunately, in the case of a retracted multi-stage tongue assembly, the retracted assembly can only accommodate a single internally mounted cylinder (i.e., a cylinder mounted within the internal tongue assembly member). As indicated above, to balance cylinder load during operation and thereby minimize cylinder wear and increase useful cylinder lifecycle, the industry has opted to place tongue dedicated cylinders inside tongue member passageways and external tongue dedicated cylinders have not been considered a viable option.

One exemplary and seemingly workable multi-stage tongue assembly is described in U.S. Pat. No. 5,113,956 which is entitled "Forwardly Folding Tool Bar" and which issued on May 19, 1992 (hereinafter "the '956 patent"). The implement configuration in the '956 patent teaches a scissors-type implement having left and right bar members mounted to a wheel supported chassis for pivotal rotation between an extended operating position and a transport position over the tongue assembly. The tongue assembly is mounted to the chassis and extends toward a tractor including several (e.g., 5) telescoped tongue members including a distal tongue member 14 that actually links to a tractor hitch. To move the bar members between the operating and transport positions the '956 patent teaches that first and second hydraulic cylinders are mounted between the chassis and a point spaced from the chassis on each of the right and left bar members, respectively. By extending cylinder rods, the bar members are driven into extended operating positions and when the rods are retracted the bar members are driven into transport positions.

The '956 patent teaches that the tongue assembly can be extended and retracted while the bar members are driven between their operating and transport positions and by the first and second hydraulic cylinders by attaching braces between the bar members and the distal tongue member. More specifically, a first rigid brace is pivotally secured at one end about midway along the right bar member and so as to form an acute angle therewith and at an opposite end to the distal tongue member and a second rigid brace is pivotally secured at one end about midway along the left bar member so as to form an acute angle therewith and at an opposite end to the distal tongue member. The '956 patent teaches that when the cylinder rods are retracted so that the bar members are in the transport position, the tongue assembly is extended so that the distal end of the assembly clears the ends of the bar members. When the cylinder rods are extended, the bar members are driven toward their extended operating positions and the braces simultaneously pull the distal tongue member toward the chassis thereby causing the tongue assembly to retract. By reversing the rods so that the rods extend, the braces force the distal tongue member away from the chassis thereby causing the tongue assembly to extend. Thus, the '956 patent configuration replaces the tongue dedicated rods with the first and second braces on opposite sides of the tongue assembly, the braces in effect operating as rods to extend and retract the tongue assembly and providing a balanced load to the distal tongue member during extension or retraction.

The '956 solution, like other solutions, has several shortcomings. First, because the '956 patent configuration cylinders are linked between the chassis and the bar members, in the case of some implements, the cylinders will get in the way of implement components (e.g., seeding buckets, ground engaging tools, etc.). Similarly, because of the locations of the braces (i.e., secured between central points of the braces and the distal tongue member), the braces also will obstruct use of certain implement components.

Second, in order to simultaneously drive the bar members between the operating and transport positions and drive the distal tongue member between the retracted and extended positions, the cylinders have to be relatively large and therefore expensive. One way to reduce cylinder size is to modify the implement configuration to increase the acute angles that the braces form with each of the bar members when the bar members are in the extended operating positions. This solution, however, leads to a third problem with the '956 patent configuration. Specifically, to simultaneously provide a workable design including braces and accommodate larger acute angles that enable the use of smaller cylinders, the overall retracted tongue assembly length must be increased which is contrary to the primary purpose for which the assembly has been designed (i.e., to reduce tongue length during implement operation and increase tongue length during implement transportation).

In any extendable tongue assembly design, it is important to provide some mechanism to maintain the tongue assembly in the retracted position during implement operation and in the extended position during transport. In the case of configurations that rely on hydraulics to drive tongue members between extended and retracted positions, assuming the hydraulic system operates properly, the hose and cylinder pressures can generally be relied upon to maintain assembly positions. However, sometimes hydraulic systems fail and therefore, ideally, some backup locking system is provided.

Some assembly designs provide a manually operated mechanical locking mechanism to accomplish this task. For instance, to lock an assembly in an extended position, a farmer may be required to insert a locking pin through tongue member apertures that align when the assembly is retracted. Similar steps may also be used to lock the assembly in the extended position. Unfortunately, in the case of manual locking mechanisms, farmers may opt not to use the manual mechanisms and instead may simply rely upon the integrity of the hydraulic system.

Still other systems have been designed to include automatic locking mechanisms. For instance, referring again to the '956 patent, the '956 patent teaches a hydraulically operated latch locking mechanism that is mounted to the distal tongue member that engages a stop member that extends from the tongue member mounted to the chassis when the assembly is in the retracted position. When the assembly is in an extended position and the bar members are in a transport position, downward extending hooks at the distal ends of the bar members are positioned over receiving apertures such that, when implement support wheels are raised, if the hooks and apertures are properly aligned, the hooks are received in the apertures and lock the entire assembly, including the tongue members, in position for transport.

While better than a manual mechanism that may be ignored, the '956 patent locking mechanism still has shortcomings. For instance, the latching mechanism relies on gravity to maintain the latch over the stop member while the implement is in the operating position. Where an implement is pulled through a field and hits a bump or a pot hole, the latch member may be jostled upward overcoming gravity and thereby becoming unlatched. Similarly, during transport the implement may be jostled thereby causing the hooks to lift out of the receiving apertures so that the assembly becomes unlocked.

In addition, the hook and aperture transport locking mechanism may not always operate well as alignment of the hooks and apertures is required for successful operation and therefore manufacturing and operating tolerances have to be relatively tight. This is especially true where movement from the operating to the transport positions has to be performed in an uneven field environment where similar hydraulic forces may drive the left and right hand bar members to different relative positions with respect to receiving apertures (i.e., after movement toward the transport positions the bar member hooks on the left and right bar members may be differently aligned with receiving apertures on the distal tongue member so that some type of manual adjustment is necessary).

Moreover, the '956 patent requires separate mechanisms for locking the tongue assembly in each of the extended and retracted positions. As in the case of any apparatus, additional components typically translate into higher manufacturing and maintenance costs and therefore should be avoided whenever possible.

Therefore, a need exists for a simple and relatively inexpensive multistage tongue assembly that includes a simple and effective automatic locking mechanism which facilitates optimal maximum and minimum tongue lengths and which will not obstruct implement component use during implement operation.

SUMMARY OF THE INVENTION

It has been recognized that where separate hydraulic cylinders have been provided for each stage in a multi-stage tongue assembly, the cylinder loads are shared between the separate cylinders and therefore the overall load requirements of each stage cylinder are reduced appreciably. Where cylinder load is reduced the cylinder can be placed "off-load" center without appreciably affecting load balance on the cylinder and therefore without appreciably reducing cylinder lifecycle. Thus, it has been recognized that, in the case of a multi-stage tongue assembly that can accommodate only a single internally mounted cylinder, additional externally mounted cylinders can be provided for each of the additional stages. For instance, in the case of a two stage assembly, a first stage may be motivated via an internally mounted cylinder and a second stage may be motivated by an externally mounted cylinder. In this case, the external cylinder will only assume a fraction (e.g., 50%) of the overall load and therefore can be placed off-load center without appreciable effects and without a balancing cylinder on the other side of the tongue assembly.

Thus, according to one embodiment of the invention, the invention includes a multi-stage tongue assembly including a separate hydraulic cylinder for each stage where at least one of the cylinders is mounted externally of the tongue members. For instance, in the case of a two stage assembly, one cylinder is mounted externally and the other cylinder may be mounted either internally or externally, in the case of a three stage assembly, at least two of the cylinders are mounted externally and the third cylinder may be mounted either internally or externally.

In addition, it has been recognized that a single simple locking mechanism can be used to lock telescoping tongue members corresponding to an assembly stage in each of extended and retracted positions. To this end, where a stage includes a first tongue member and a second tongue member that is receivable within the passageway formed by the first tongue member, the locking mechanism includes at least one latching member that is pivotally mounted to the first member and that extends past the end of the first member from which the second member telescopes. A distal end of the latch member extends toward the second member and a spring biases the distal end toward the second member. A hydraulic cylinder is mounted to the latch member such that, when the cylinder rod is extended, the rod overcomes the spring force and forces the distal end away from the second member. The second member forms at least first and second slots or apertures corresponding to the retracted and extended stage positions which are aligned with the distal end when the second member is in the retracted and extended positions, respectively. Thus, when the second member is in the retracted position and the cylinder is de-energized, the distal end is forced into and held within the first aperture by the spring. Upon energizing the latching cylinder the distal end is forced out of the first aperture and the tongue cylinders can be used to force the second member into the extended position. Once in the extended position, when the latching cylinder is de-energized, the spring forces the distal end toward the second member and into the second slot thereby locking the relative positions of the first and second cylinders. A separate locking mechanism is provided for each assembly stage.

Moreover, it has been recognized that adjustable stop members can be provided that allow for after manufacturing adjustment of the relative positions of the stop members and locking mechanism components to ensure that locking mechanism components can be properly and automatically aligned thereby reducing required manufacturing tolerances and thus reducing manufacturing costs.

Consistent with the above, the present invention includes an extendable apparatus for securing an agricultural implement to a hitch receiving member of a vehicle, the apparatus comprising a first elongated tongue member having a first external surface and forming a first passageway, a second elongated tongue member having a second external surface, forming a second passageway and slidably mounted within the first passageway, the first and second tongue members being a first tongue pair, a third elongated tongue member having a third external surface, forming a third passageway and slidably mounted within the second passageway, the second and third tongue members being a second tongue pair, one of the first and third tongue members mounted to the implement, a first tongue cylinder including a first rod member mounted within a first base member and having a first distal end, the first base member and first distal end secured to separate ones of the first tongue pair members such that when the first rod member is extended the second tongue member extends from the first passageway and when the first rod member is retracted the second tongue member is substantially received within the first passageway and a second tongue cylinder including a second rod member mounted within a second base member and having a second distal end, the second base member and second distal end secured to separate ones of the second tongue pair members such that when the second rod member is extended the third tongue member extends from the second passageway and when the second rod member is retracted the third tongue member is substantially received within the second passageway wherein at least one of the first and second cylinders is secured to the external surfaces of a tongue pair.

In one embodiment the first base member and the first distal end are secured to the external surfaces of the first tongue pair. More specifically, the first base member may be secured to the external surface of the first tongue member and the first distal end may be secured to the external surface of the second tongue member. Here, each of the first and second tongue members may have first and second ends and, when the second tongue member is substantially received within the first passageway, the first end of the second tongue member may be proximate the first end of the first tongue member and when the second tongue member is extended from the first passageway, the first end of the second tongue member may be proximate the second end of the first tongue member, the first distal end secured to the second tongue member proximate the second end of the second tongue member. The second tongue cylinder may be mounted inside the third passageway.

Furthermore, in some embodiments each of the second and third tongue members has first and second ends and, when the third tongue member is substantially received within the second passageway, the first end of the third tongue member is proximate the first end of the second tongue member and when the third tongue member is extended from the second passageway, the first end of the third tongue member is proximate the second end of the second tongue member, the second distal end secured to the second tongue member proximate the first end of the second tongue member.

In some embodiments the second tongue cylinder is mounted inside one of the first and third passageways. Furthermore, each of the second and third tongue members may have first and second ends and, when the third tongue member is substantially received within the second passageway, the first end of the third tongue member may be proximate the first end of the second tongue member and when the third tongue member is extended from the second passageway, the first end of the third tongue member may be proximate the second end of the second tongue member, the second distal end secured to the second tongue member proximate the first end of the second tongue member.

In yet other embodiments the tongue members together form a tongue assembly having an external assembly surface and each of the first and second tongue cylinders is secured to the assembly surface. Here, the first tongue cylinder may be secured to a first side of the assembly surface and the second tongue cylinder may be secured to a second side of the assembly surface and wherein the second side is different than the first side.

Some embodiments further include at least a fourth elongated tongue member having a fourth external surface, forming a fourth passageway and slidably mounted within the third passageway, the third and fourth tongue members being a third tongue pair, the apparatus further including a third tongue cylinder including a third rod member mounted within a third base member and having a third distal end, the third base member and third distal end secured to separate ones of the third tongue pair members such that when the third rod member is extended the fourth tongue member extends from the third passageway and when the third rod member is retracted the fourth tongue member is substantially received within the third passageway and, wherein, the tongue members together form a tongue assembly having an external assembly surface and wherein at least two of the tongue cylinders are secured to the assembly surface, a first of the at least two cylinders secured to a first side of the assembly surface and a second of the at least two cylinders secured to a second side of the assembly surface and wherein the second side is different than the first side.

In most embodiments the first and second tongue cylinders are plumbed in parallel.

In another aspect the invention further includes a first locking assembly mounted to one of the first tongue pair members and operable to lock the first tongue pair members in at least one of a retracted and an extended position and also including a second locking assembly mounted to one of the second tongue pair members and operable to lock the second tongue pair members in at least one of a retracted and an extended position. Here the first locking assembly may be operable to lock the first tongue pair members in each of the extended and retracted positions and the second locking assembly may be operable to lock the second tongue pair members in each of the extended and retracted positions.

More specifically, each of the first and second tongue members may have first and second ends and wherein, when the second tongue member is in the retracted position, the first end of the second tongue member is proximate the first end of the first tongue member and when the second tongue member is in the extended position, the first end of the second tongue member may be proximate the second end of the first tongue member, the first locking assembly including at least a first arm member, a first spring member and a first locking cylinder, the first arm member pivotally mounted to the external surface of the first tongue member and having a first locking end that extends past the second end of the first tongue member and toward the second tongue member, the spring member secured proximate the first locking end to pull the first locking end toward the second tongue member, the first locking cylinder secured proximate the first locking end such that when a first locking cylinder rod is extended, the first locking end is forced away from the second tongue member, the second tongue member forming first and second slots proximate the first and second ends of the second tongue member, respectively, for receiving the first locking end when the second tongue member is in the retracted and extended positions, respectively.

The first locking assembly may further include a second arm member pivotally mounted to the external surface of the first tongue member on a side of the first tongue member opposite the first arm member and having a second locking end that extends past the second end of the first tongue member and toward the second tongue member, the spring member further secured proximate the second locking end to pull the second locking end toward the second tongue member, the first locking cylinder further secured proximate the second locking end such that when the first locking cylinder rod is extended, the second locking end is forced away from the second tongue member, the second tongue member forming third and fourth slots proximate the first and second ends of the second tongue member, respectively, for receiving the second locking end when the second tongue member is in the retracted and extended positions, respectively.

Each of the second and third tongue members may have first and second ends and, when the third tongue member is in the retracted position, the first end of the third tongue member may be proximate the first end of the second tongue member and when the third tongue member is in the extended position, the first end of the third tongue member may be proximate the second end of the second tongue member. Here, the second locking assembly may include third and fourth arm members, a second spring member and a second locking cylinder, the third and fourth arm members pivotally mounted to opposite sides of the external surface of the second tongue member and having third and fourth locking ends that extend past the second end of the second tongue member and toward the third tongue member, respectively, the second spring member secured proximate the third and fourth locking end to pull the third and fourth locking ends toward the third tongue member, the second locking cylinder secured proximate the third and fourth locking ends such that when a second locking cylinder rod is extended, the third and fourth locking ends are forced away from the third tongue member, the third tongue member forming fourth and fifth slots proximate the first and second ends of the third tongue member, respectively, for receiving the third locking end when the third tongue member is in the retracted and extended positions, respectively, and also forming sixth and seventh slots proximate the first and second ends of the third tongue member, respectively, for receiving the forth locking end when the third tongue member is in the retracted and extended positions, respectively.

Here, the locking cylinders may be plumbed in parallel with the first and second tongue cylinders.

The invention further includes an extendable apparatus for securing an agricultural implement to a hitch receiving member of a vehicle, the apparatus comprising a first elongated tongue member having a first external surface and first and second ends, forming a first passageway and mounted to the implement, a second elongated tongue member having a second external surface and first and second ends, forming a second passageway and slidably mounted within the first passageway for movement between a retracted position where the first end of the second tongue member is proximate the first end of the first tongue member and an extended position wherein the first end of the second tongue member is proximate the second end of the first tongue member, a locking assembly including at least a first arm member, a first spring member and a first locking cylinder, the first arm member pivotally mounted to the external surface of the first tongue member and having a first locking end that extends past the second end of the first tongue member and toward the second tongue member, the spring member secured proximate the first locking end to pull the first locking end toward the second tongue member, the first locking cylinder secured proximate the first locking end such that when a first locking cylinder rod is extended, the first locking end is forced away from the second tongue member, the second tongue member forming first and second slots proximate the first and second ends of the second tongue member, respectively, for receiving the first locking end when the second tongue member is in the retracted and extended positions, respectively.

In some embodiments the first locking assembly further includes a second arm member pivotally mounted to the external surface of the first tongue member on a side of the first tongue member opposite the first arm member and having a second locking end that extends past the second end of the first tongue member and toward the second tongue member, the spring member further secured proximate the second locking end to pull the second locking end toward the second tongue member, the first locking cylinder further secured proximate the second locking end such that when the first locking cylinder rod is extended, the second locking end is forced away from the second tongue member, the second tongue member forming third and fourth slots proximate the first and second ends of the second tongue member, respectively, for receiving the second locking end when the second tongue member is in the retracted and extended positions, respectively.

In other embodiments the first and second tongue members are a first tongue pair and the locking mechanism is a first locking assembly, the apparatus further including a third elongated tongue member having a third external surface and first and second ends, forming a third passageway and slidably mounted within the second passageway for movement between a retracted position where the first end of the third tongue member is proximate the first end of the second tongue member and an extended position wherein the first end of the third tongue member is proximate the second end of the second tongue member, the second and third tongue members being a second tongue pair and a second locking assembly including third and fourth arm members, a second spring member and a second locking cylinder, the third and fourth arm members pivotally mounted on opposite sides of the external surface of the second tongue member and having third and fourth locking ends that extends past the second end of the second tongue member and toward the third tongue member, the second spring member secured proximate the third and fourth locking ends to pull the third and fourth locking ends toward the third tongue member, the second locking cylinder secured proximate the third and fourth locking ends such that when a second locking cylinder rod is extended, the third and fourth locking ends are forced away from the third tongue member, the third tongue member forming fifth and sixth slots proximate the first and second ends of the third tongue member, respectively, for receiving the third locking end when the third tongue member is in the retracted and extended positions, respectively, the third tongue member also forming seventh and eighth slots proximate the first and second ends of the third tongue member, respectively, for receiving the fourth locking end when the third tongue member is in the retracted and extended positions, respectively.

Moreover, the invention also includes an extendable apparatus for securing an agricultural implement to a hitch receiving member of a vehicle, the apparatus comprising a first elongated tongue member having a first external surface and first and second ends, forming a first passageway and mounted to the implement, a second elongated tongue member having a second external surface and first and second ends, forming a second passageway and slidably mounted within the first passageway for movement between a retracted position where the first end of the second tongue member is proximate the first end of the first tongue member and an extended position wherein the first end of the second tongue member is proximate the second end of the first tongue member, the first and second tongue members being a first tongue pair, a third elongated tongue member having a third external surface and first and second ends, forming a third passageway and slidably mounted within the second passageway for movement between a retracted position where the first end of the third tongue member is proximate the first end of the second tongue member and an extended position wherein the first end of the third tongue member is proximate the second end of the second tongue member, the second and third tongue members being a second tongue pair, a first locking assembly mounted to one of the first tongue pair members and operable to lock the first tongue pair members in each of a retracted and an extended position and a second locking assembly mounted to one of the second tongue pair members and operable to lock the second tongue pair members in each of a retracted and an extended position.

In other embodiments the first locking assembly includes first and second arm members, a first spring member and a first locking cylinder, the first and second arm members pivotally mounted on opposite sides of the external surface of the first tongue member and having first and second locking ends that extends past the second end of the first tongue member and toward the second tongue member, the first spring member secured proximate the first and second locking ends to pull the first and second locking ends toward the second tongue member, the first locking cylinder secured proximate the first and second locking ends such that when a first locking cylinder rod is extended, the first and second locking ends are forced away from the second tongue member, the second tongue member forming first and second slots proximate the first and second ends of the second tongue member, respectively, for receiving the first locking end when the second tongue member is in the retracted and extended positions, respectively, the second tongue member also forming third and fourth slots proximate the first and second ends of the second tongue member, respectively, for receiving the second locking end when the second tongue member is in the retracted and extended positions, respectively, and the second locking assembly includes third and fourth arm members, a second spring member and a second locking cylinder, the third and fourth arm members pivotally mounted on opposite sides of the external surface of the second tongue member and having third and fourth locking ends that extends past the second end of the second tongue member and toward the third tongue member, the second spring member secured proximate the third and fourth locking ends to pull the third and fourth locking ends toward the third tongue member, the second locking cylinder secured proximate the third and fourth locking ends such that when a second locking cylinder rod is extended, the third and fourth locking ends are forced away from the third tongue member, the third tongue member forming fifth and sixth slots proximate the first and second ends of the third tongue member, respectively, for receiving the third locking end when the third tongue member is in the retracted and extended positions, respectively, the third tongue member also forming seventh and eighth slots proximate the first and second ends of the third tongue member, respectively, for receiving the fourth locking end when the third tongue member is in the retracted and extended positions, respectively.

Still other embodiments include first and second tongue cylinders, the first tongue cylinder mounted to the first tongue pair to drive the first pair members between the extended and retracted positions and the second tongue cylinder mounted to the second tongue pair to drive the second pair members between the extended and retracted positions.

DETAILED DESCRIPTION OF THE PREFERRED EMBODIMENTS

Referring now to FIGS. 1 through 4, a preferred embodiment of the present invention will be described in the context of an agricultural assembly 10 which includes a carrier frame assembly 12, a main frame assembly 69 and an implement assembly 15. As its label implies, carrier frame assembly 12 includes components configured to facilitate transport or carrying of other assembly 10 components. Similarly, as their labels imply, main frame assembly 69 includes components configured to generally support any of several different implement assemblies while implement assembly 15, includes components used to carry out a specific agricultural process corresponding to a specific implement. For instance, the components that comprise the implement assembly may be used for tilling, fertilizing, planting, etc. Main frame assembly 69 is mounted to carrier frame assembly 12 and implement assembly 15 is mounted to main frame assembly 69.

The present invention generally resides in the carrier frame assembly 12 and, more particularly, in the tongue or hitch sub-assembly that forms part of the carrier frame assembly 12. For this reason, hereinafter, first, an exemplary implement assembly 15 and the main frame assembly 69 are described in minimal detail and thereafter carrier frame assembly 12 is described in greater detail.

Figure 3:
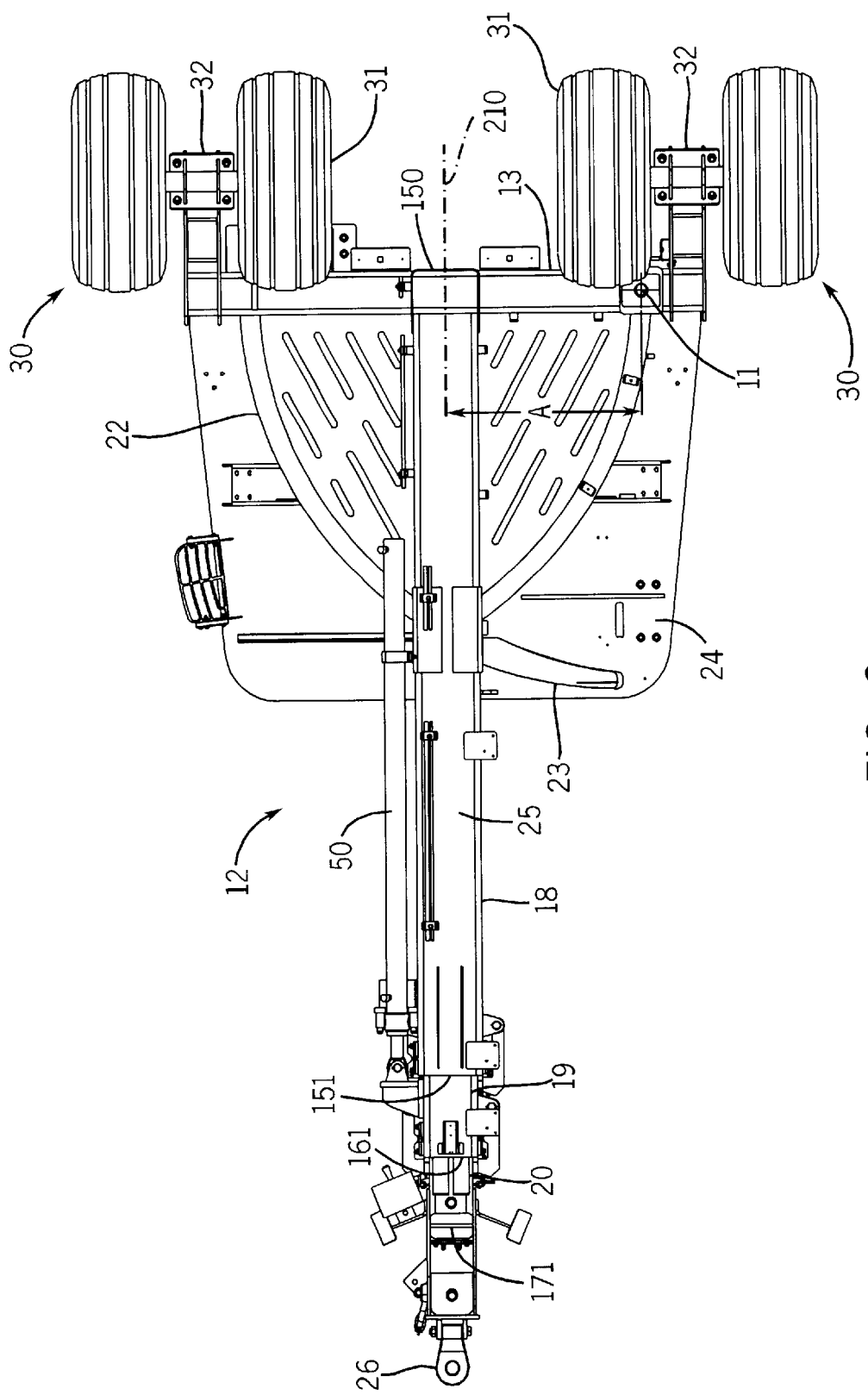
FIG. 3 is a bottom plan view of the carrier frame illustrated in FIG. 1.
Figure 4:
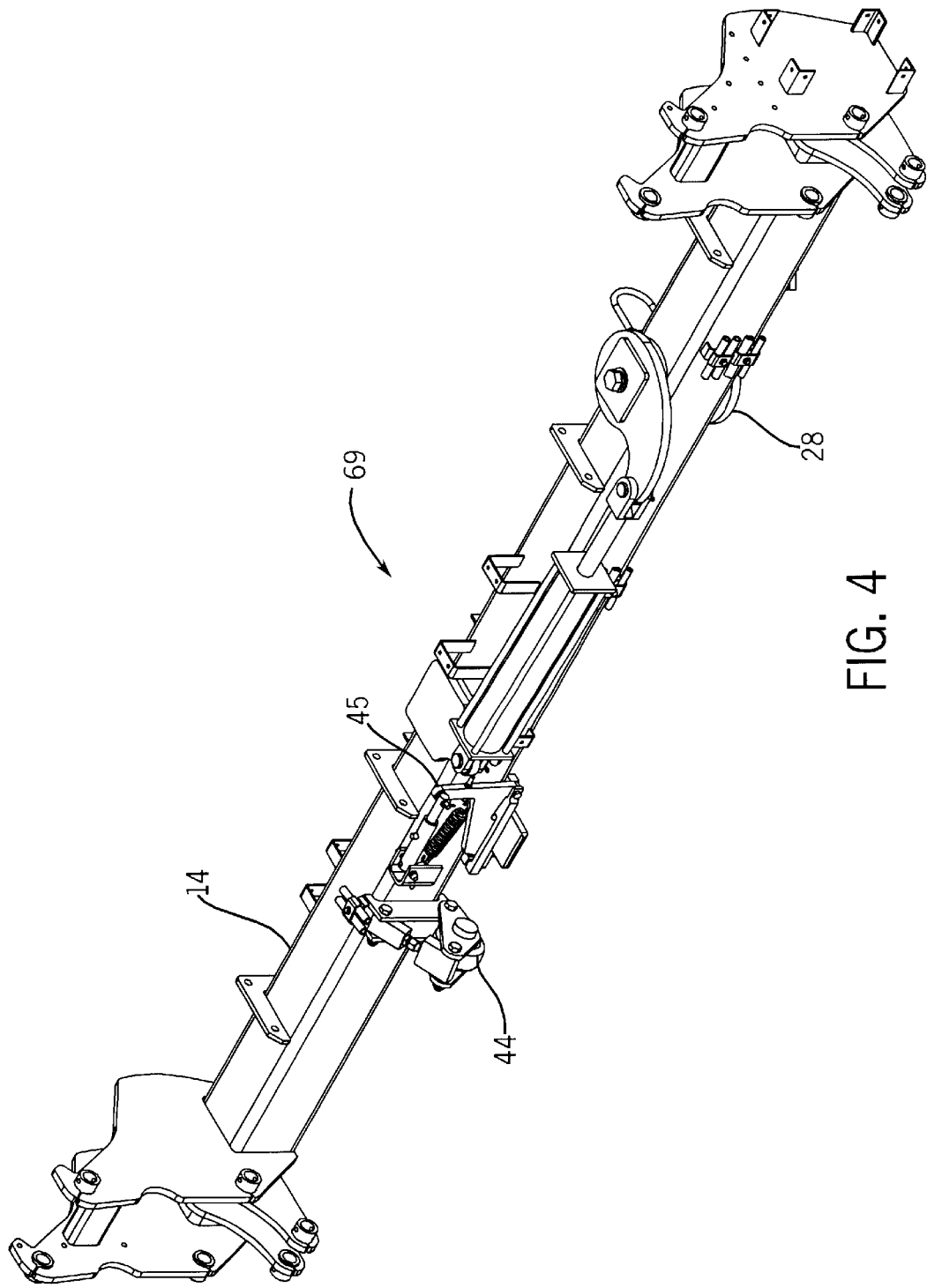
FIG. 4 is a perspective view of a mainframe assembly used with the configuration of FIG. 1.
Figure 5:
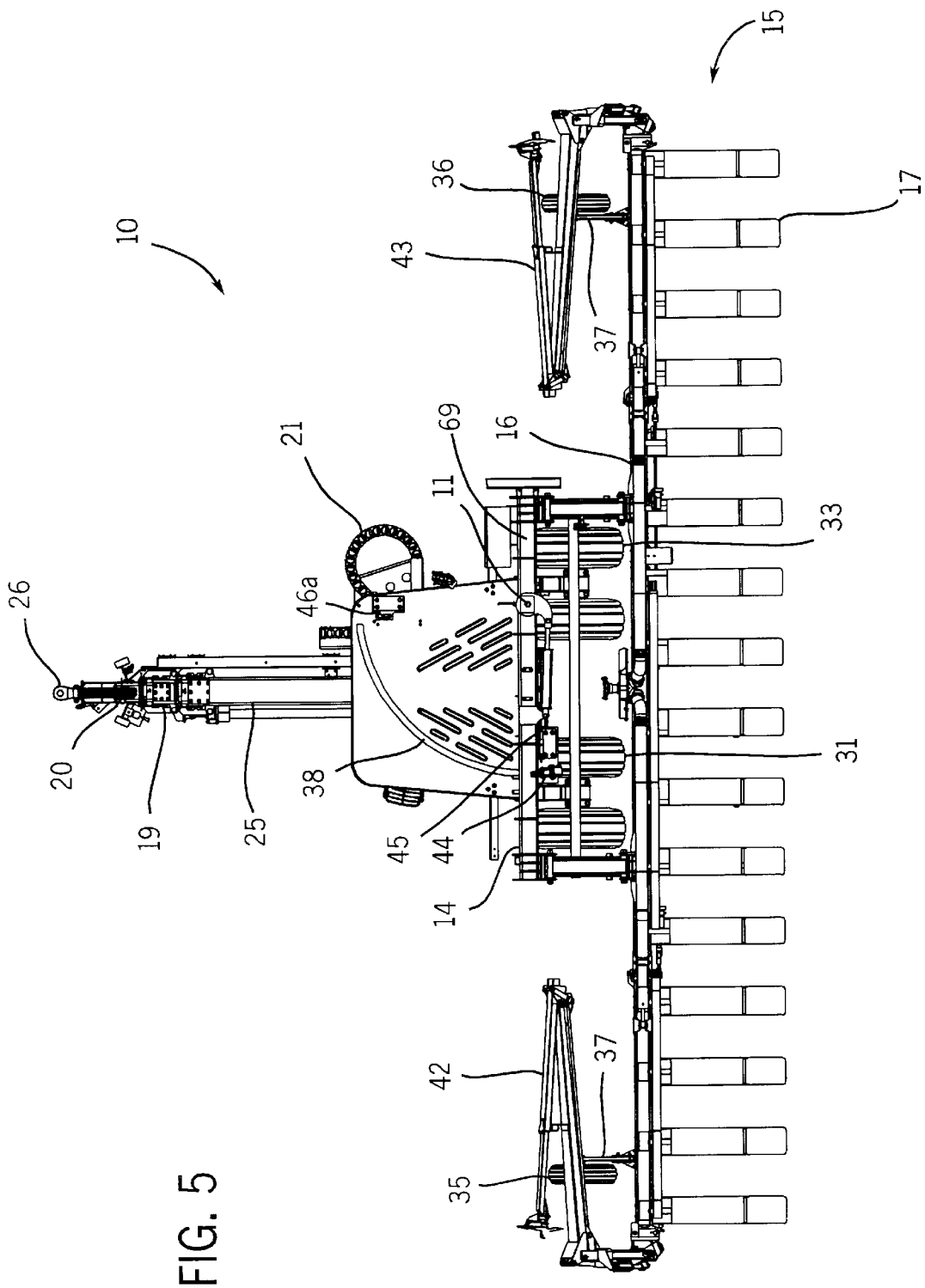
FIG. 5 is a top plan view of the embodiment of FIG. 1 in an extended operating position.

Referring still to FIGS. 1 through 4 and also to FIG. 5 (and generally to other Figures in the specification), the exemplary implement assembly 15 includes a bar member 16, implement components 17 (e.g., planting devices), wheels 35, 36, wheel support members 37 and extendable markers 42, 43. Bar member 16 is typically a rigid steel rectilinear bar having dimensions within the six by six to ten by ten range and extends along the length of implement assembly 15. Bar 16 is generally mounted to main frame assembly 69 in any manner known in the art and the relationship between implement assembly 15 and the main frame assembly 69 is adjustable.

Wheels 35 and 36 are mounted via wheel support members 37 at opposite ends of bar 16 and are generally positionable in multiple positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10.

Figure 6:
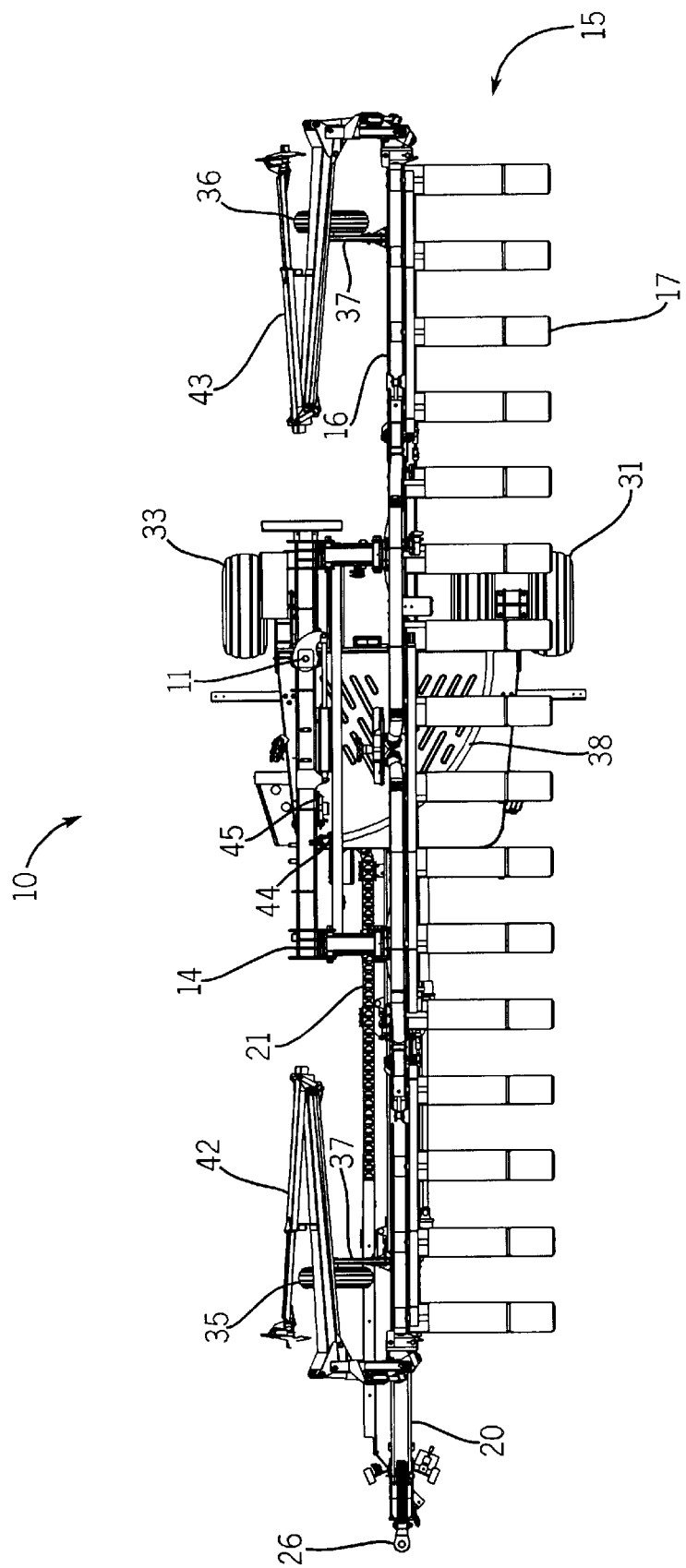
FIG. 6 is a top plan view of the embodiment of FIG. 1 in a transport position.

Referring now to FIG. 4, the main frame assembly 69 includes, among other components, a main frame bar member 14, a roller assembly 14, a latching assembly 45 and a pivot plate 28. Pivot plate 28 is mounted to an undersurface of bar member 14 about one-fourth the length of bar member 14 from a first end thereof and forms a downwardly opening pivot receiving aperture (not observable in the FIGS.) for receiving a carrier frame assembly pivot pin (see 34 in FIG. 2) which is described in more detail below. Latch assembly 45 cooperates with other system latching components (e.g., see transport bracket 46a and operating bracket 46b in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equispaced along the length of bar 14. Positioning of plate 28 and wheel assembly 44 is important to ensure proper balancing of the attached implement assembly 15 and is generally a function of how best to balance assembly 15 about a carrier assembly axis 210 (see FIGS. 1 and 2).

Figure 7:
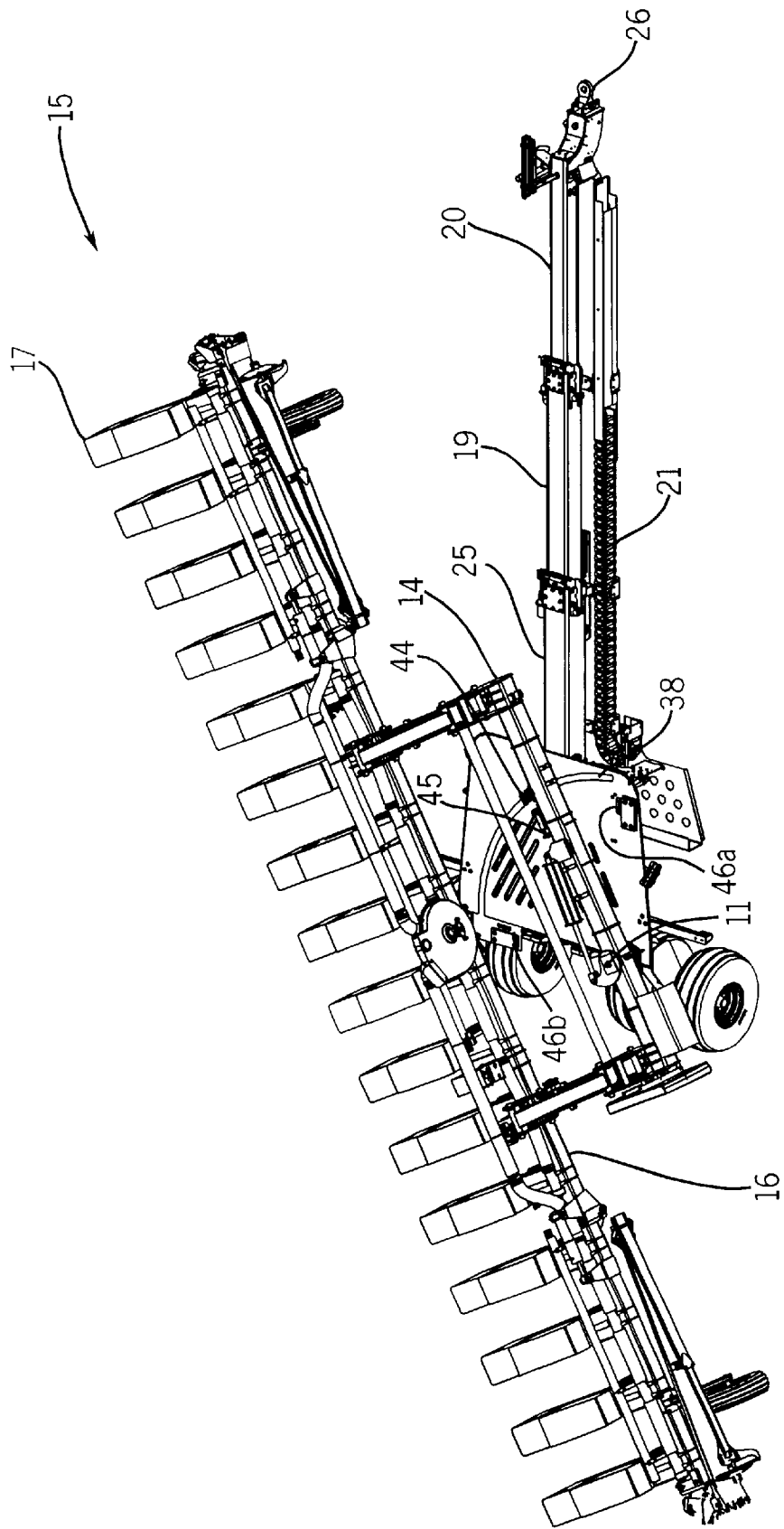
FIG. 7 is a perspective view of the embodiment of FIG. 1 in an intermediate position with an implement between the operating and the transport positions.
Figure 8:
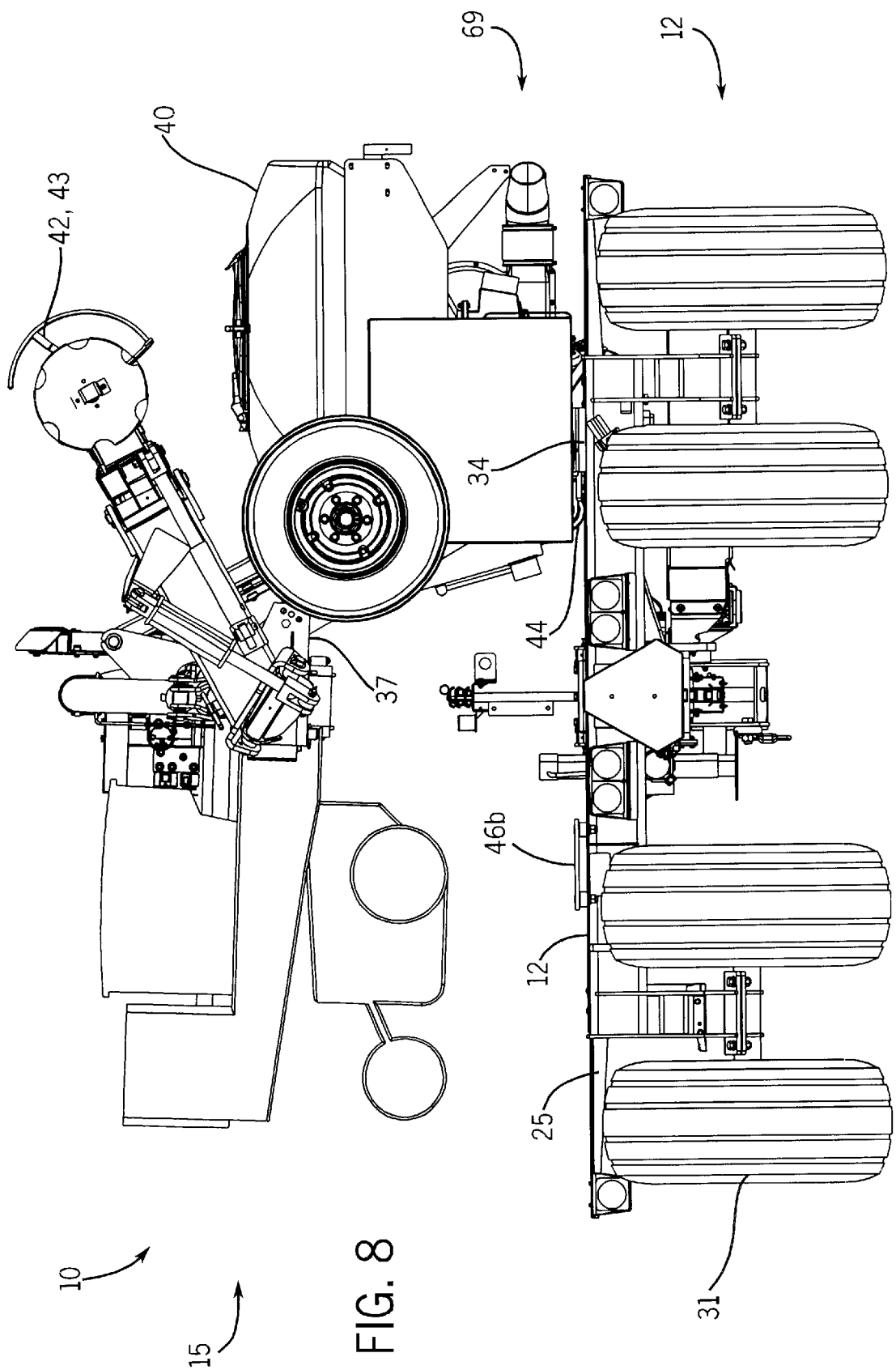
FIG. 8 is a rear perspective view of the embodiment illustrated in FIG. 1 with storage units attached and in the transport position.
Figure 9:
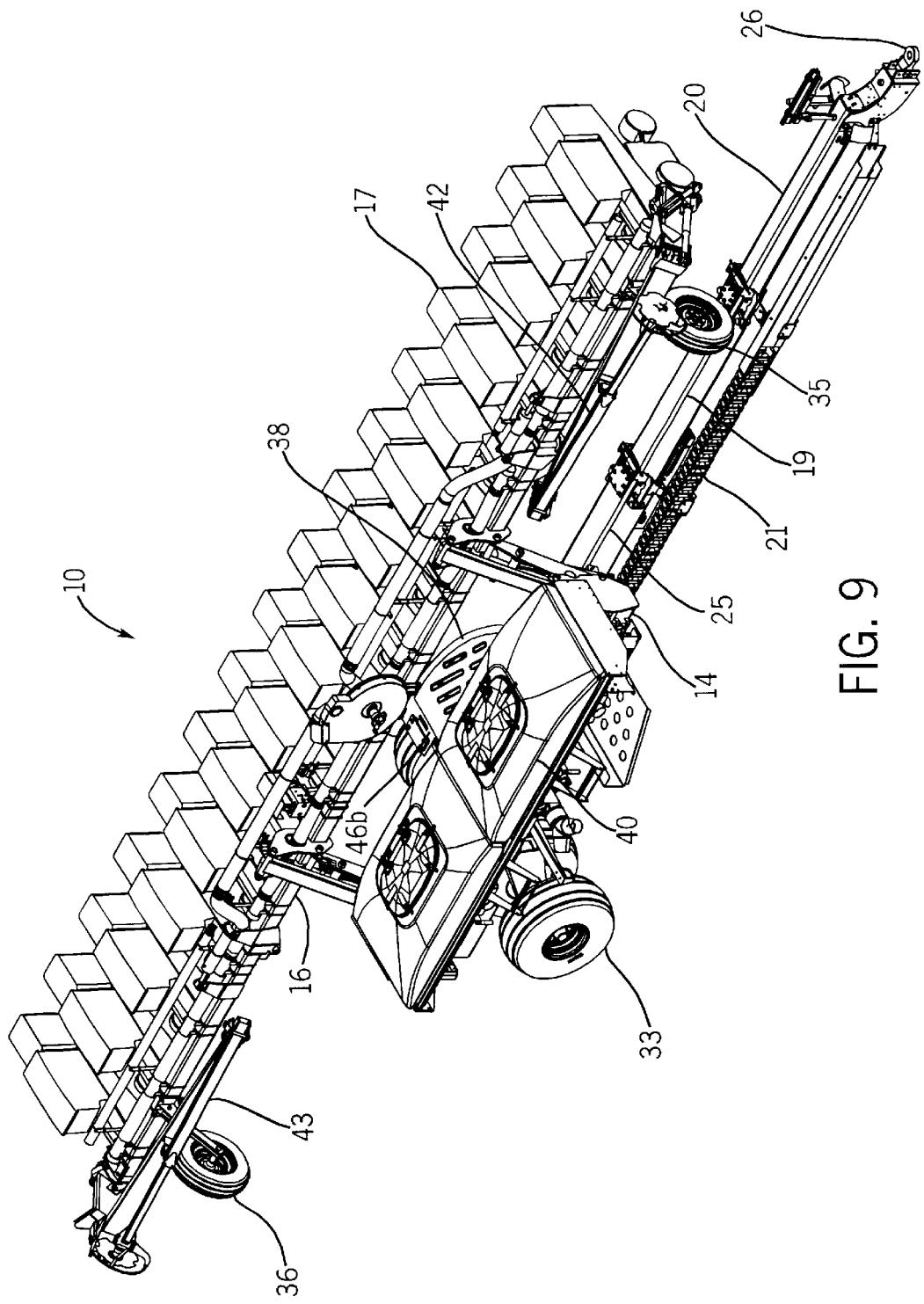
FIG. 9 is a perspective view of the embodiment of FIG. 8 with storage units in the transport position.

Bar member 14 is configured so as to have means for attaching the implement assembly bar member 16 to main frame bar member 14 at either end of the main frame bar member 14. Representative views that show attachment are FIGS. 1 and 5 through 7. While many linking means are contemplated, as illustrated in FIG. 4, exemplary means include rigid receiving plates and bolt holes (not separately numbered) for receiving some type of clamping brackets. Referring to FIGS. 8 and 9, in addition to the components described above, storage pods 40 are shown secured to the main frame bar 14.

Referring still to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of wheels 31 mounted on opposite sides of a corresponding support member 32.

Figure 11:
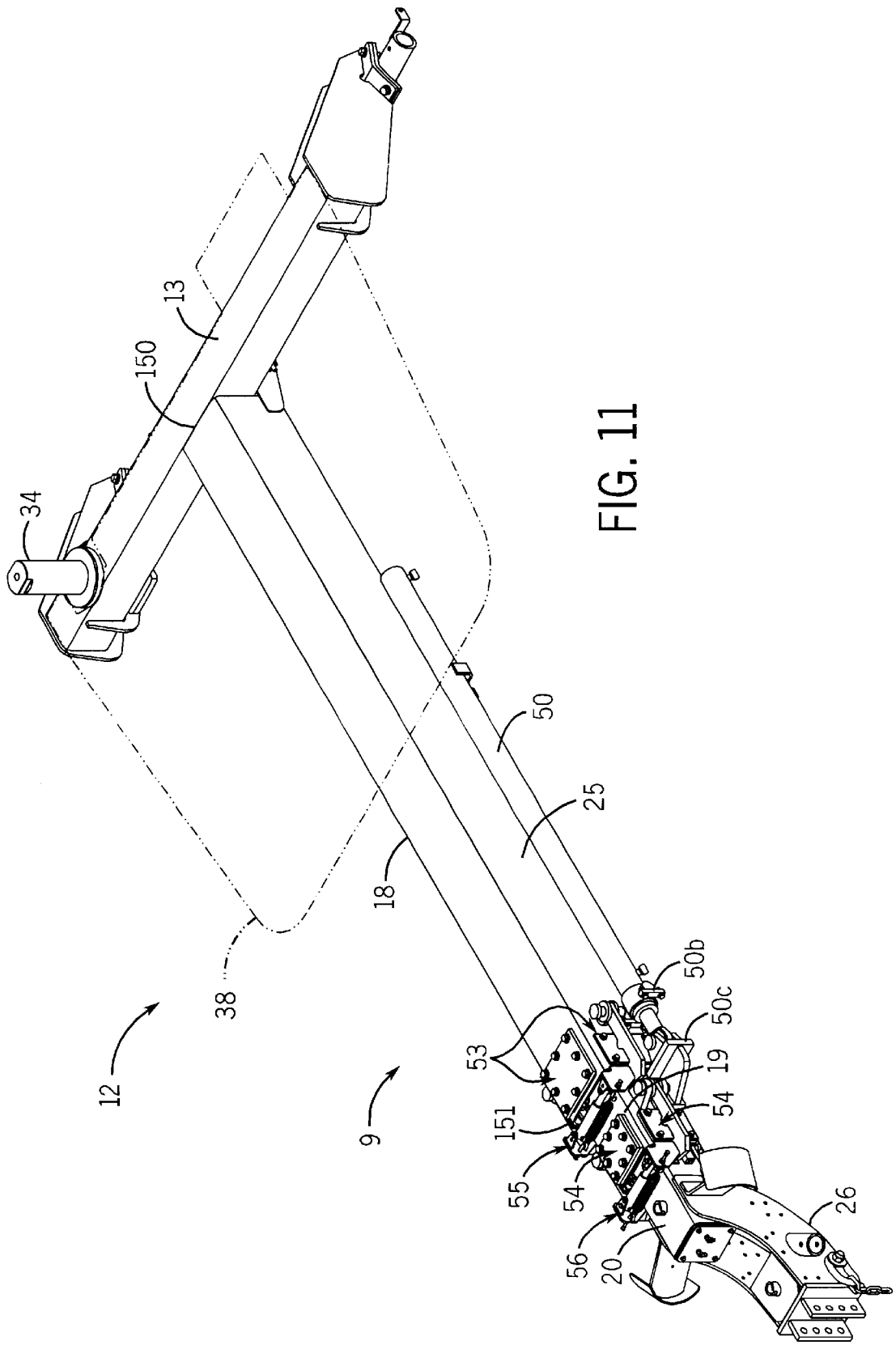
FIG. 11 is a perspective view of the carrier frame assembly of FIG. 10, albeit in a retracted or implement operating position.

Referring also to FIG. 11, cross bar 13 is a steel elongated bar. A separate one of wheel assemblies 30 is mounted at each one of the cross bar 13 ends and extends downward therefrom so that assemblies 30 support cross bar 13 above ground.

Referring still to FIG. 11, a pivot pin 34 is provided that extends upwardly from a top surface of bar 13. Pin 34 is formed about a vertical axis 11 and is formed so as to be receivable by the downwardly facing opening formed by pivot plate 28 (see FIG. 4) for rotation thereabout.

Figure 1:
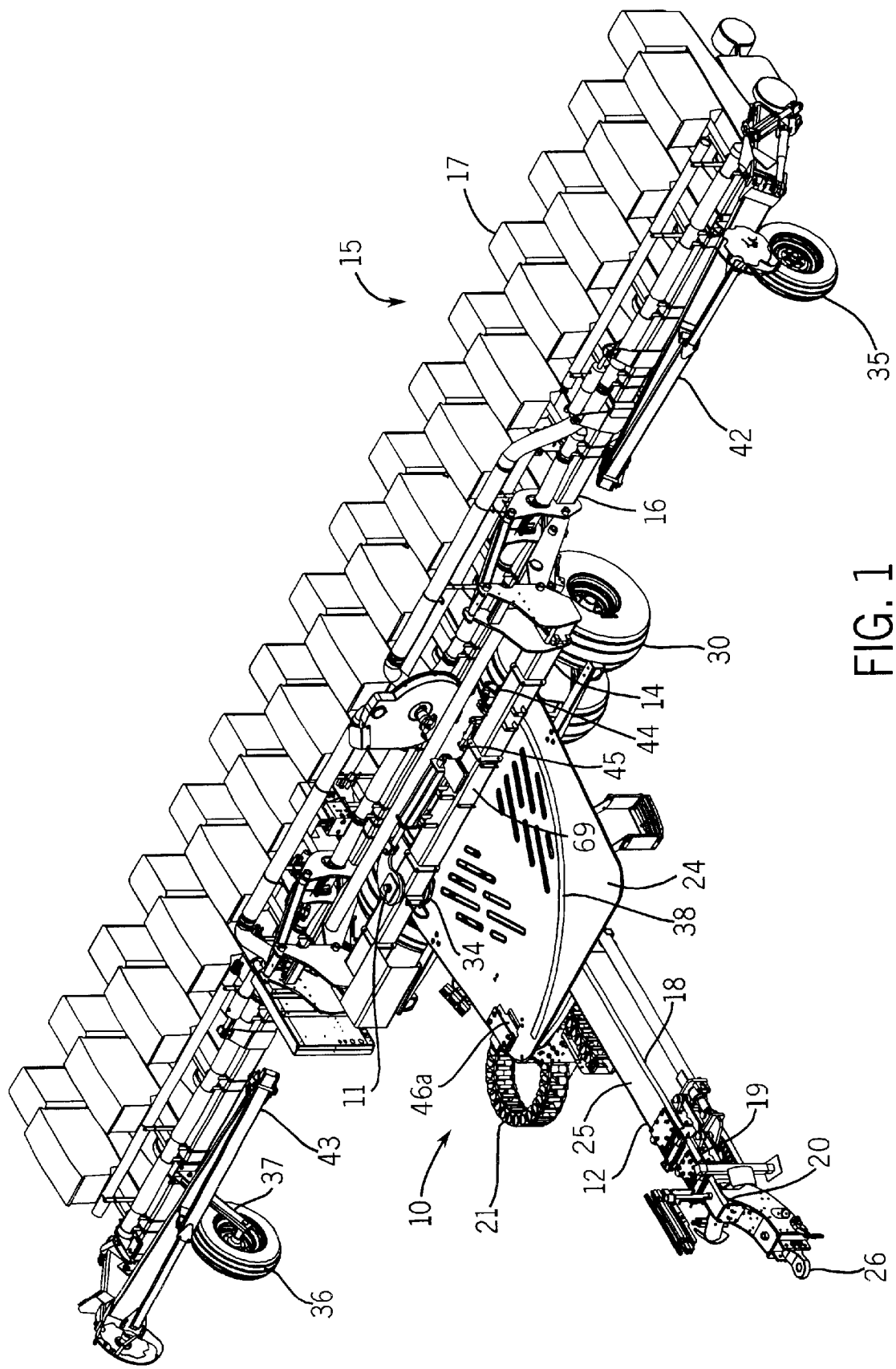
FIG. 1 is a is perspective view of a preferred embodiment of a planter apparatus constructed in accordance with one embodiment of the present invention.
Figure 2:
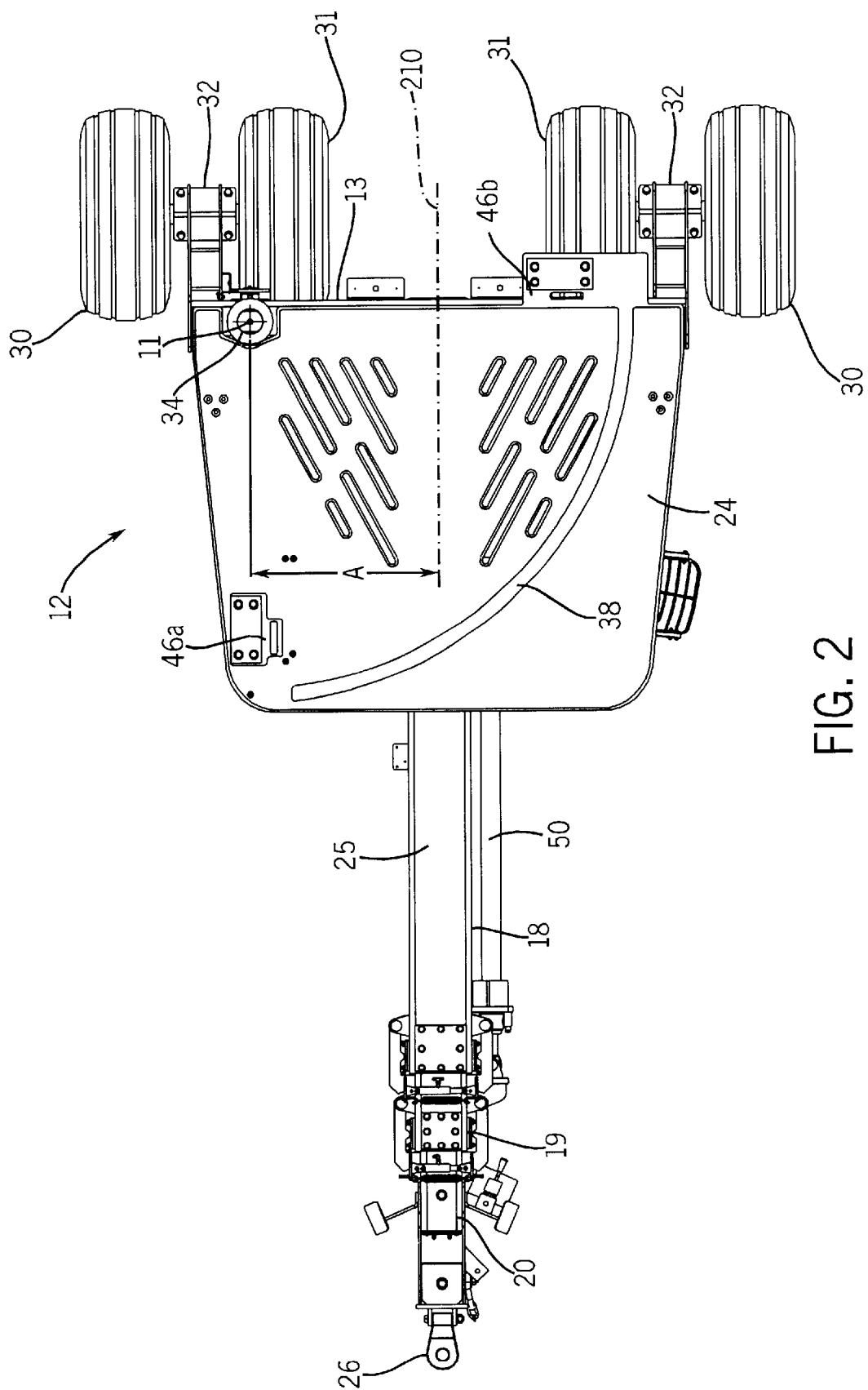
FIG. 2 is a top plan view of the carrier frame of illustrated in FIG. 1.

Referring to FIGS. 2, 3, 11 and 22, draw bar assembly 18 is a two stage tongue assembly that is described in greater detail below. Suffice it to say at this time that, among other components, assembly 18 includes a first tongue member 25 having first and second ends 150 and 151 and forming a first passageway 152. First tongue member 25 also forms an external surface 154. As best seen in FIGS. 3 and 11, first tongue member 25 is secured at its first end 150 to a central point of cross bar 13 via welding or some other suitable securing process.

Referring to FIGS. 2, 3, 8, platform 24 is essentially a rigid flat bed member that is secured to a top surface of cross bar 13 and approximately half of first tongue member 25 proximate cross bar 13. Among other features, platform 24 forms a track runner 38 on a top surface which is reinforced on a platform undersurface (see FIG. 3) via supporting tracks 23 and 22 or in any other manner known in the art. Pivot pin 34 extends through an opening in platform 24. Referring also to FIG. 4, track runner 38 forms an arc about pivot pin 34 having a radius dimension that is identical to the space dimension between pivot plate 28 and roller assembly 44 on bar 14. Runner 38 is dimensioned so as to securely support the roller of assembly 44 in any position along the runner and thereby provide support to main frame bar 14 thereabove.

Referring still to FIGS. 2 and 4, transport and operating implement locking brackets, such as transport bracket 46a and operating bracket 46b, are also provided on the top surface of platform 24. A transport bracket 46a is generally spaced from pivot pin 34 along a line parallel to the length of first tongue member 25 while an operating bracket 46b is generally spaced from pin 34 on the side of first tongue member 25 opposite pin 34. Each of transport bracket 46a and operating bracket 46b is formed so as to securely receive and lock the latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35, 36 are off the ground, the entire main frame bar 14 and components attached thereto are moveable between the transport position illustrated in FIG. 9 to the operating position illustrated in FIG. 1 and to any intermediate position therebetween (see FIG. 7) by simply rotating main frame bar 14 about pivot pin 34. As indicated above, when in either the transport or operating positions, latch assembly 45 and one of the transport bracket 46a or operating brackets 46b cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

Referring now to FIGS. 1, 9, 10 and 11, an exemplary two stage tongue assembly according to the present invention includes the first tongue member 25 described above, second and third tongue members 19 and 20, respectively, a hitch assembly 26 and first and second hydraulic tongue cylinders 50 and 52, respectively.

Figure 18:
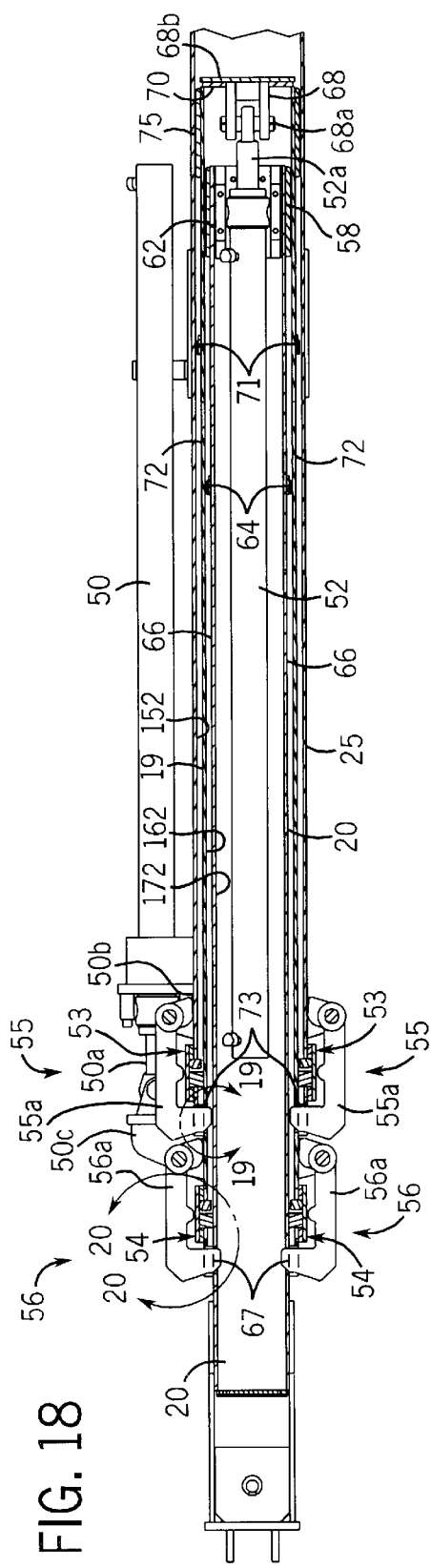
FIG. 18 is a horizontal cross-sectional view of the hitch assembly taken along line 18—18 of FIG. 15 with the hitch assembly in the retracted position.
Figure 22:
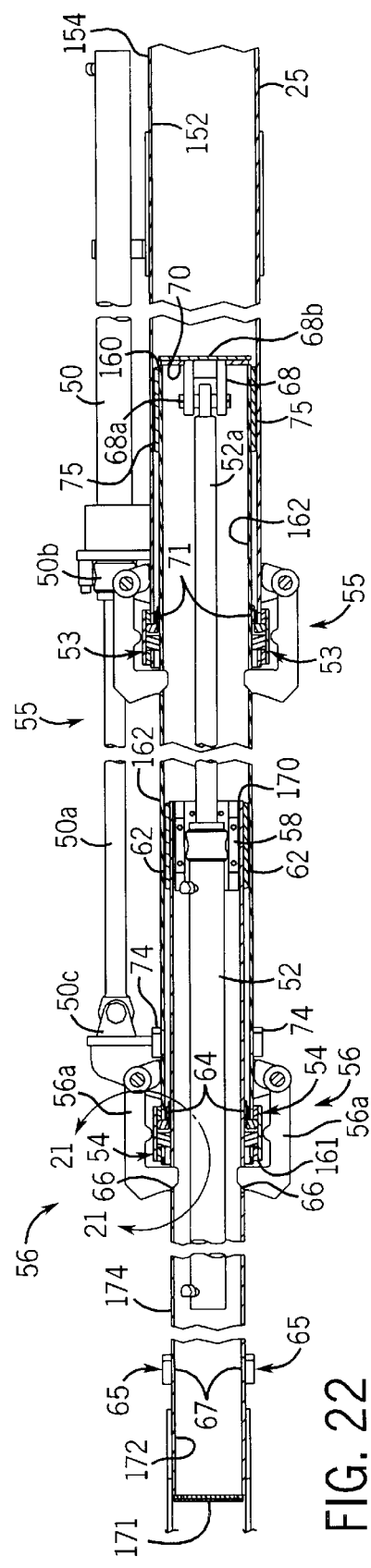
FIG. 22 is similar to FIG. 18, albeit with the tongue members shown in the extended position with the latches in a latched and locked position.
Figure 24:
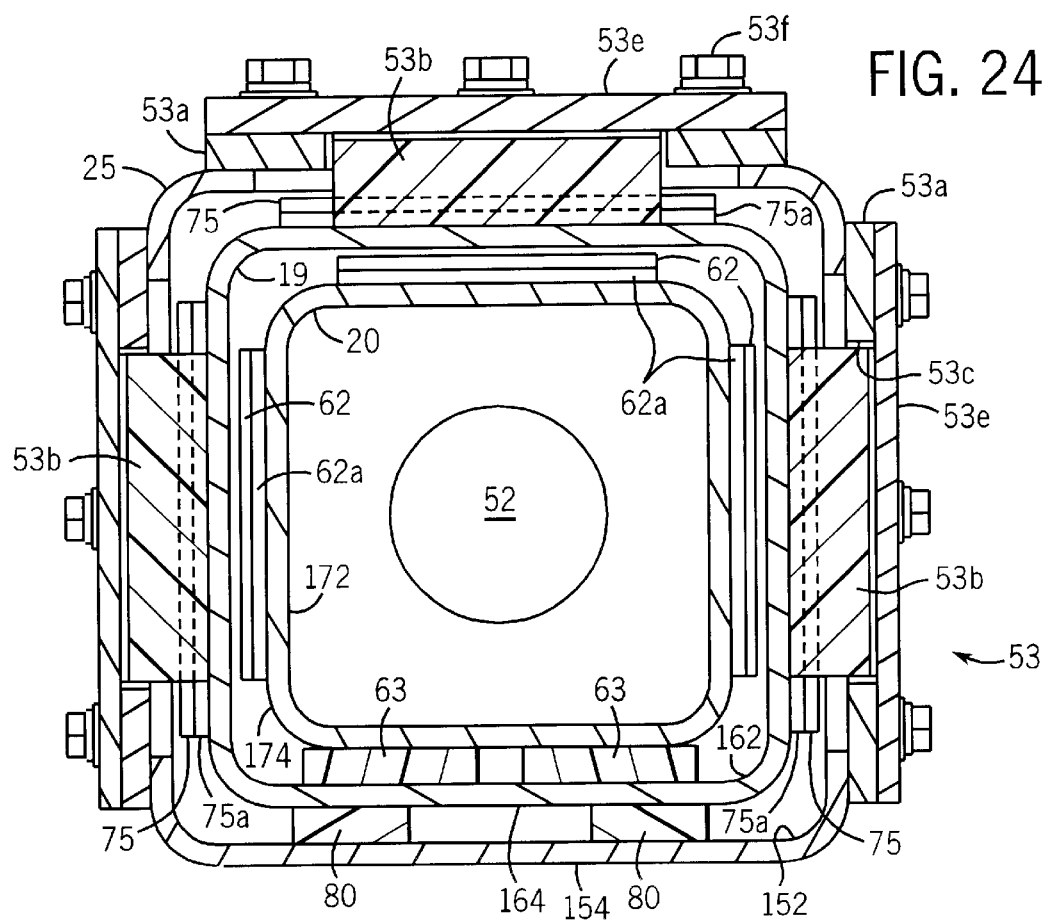
FIG. 24 is a cross-sectional view taken along lines 24—24 of FIG. 16.

Referring also to FIGS. 18, 22 and 24, as described above, first member 25 has first and second ends 150 and 151, an external surface 154, forms a first passageway 152 and is secured to a central point on cross bar 13. Second tongue member 19 has first and second ends 160 and 161, an external surface 164 and forms a second passageway 162 while third tongue member 20 has first and second ends 170 and 171, has an external surface 174 and forms a third passageway 172. Hitch assembly 26 is secured to the second end 171 of third tongue member 20. Attached to the two-stage tongue is a power cable control system 21 that retracts during implement operation and extends during transport.

Referring to FIGS. 12–14, 18 and 22–24, third tongue member 20 is dimensioned to be received within second passageway 162 with minimal clearance while second tongue member 19 is dimensioned to be received within first passageway 152.

Smooth sliding motion between tongue members 19 and 20 is aided by providing bearing pads 62 on the external surface 174 of first tongue member 25. To reduce the space between the external surface 174 and the surface which forms second passageway 162, shims 62a are provided between external surface 174 and the pads 62. The pads 62 and shims 62a are attached to external surface 174 on the top and the two vertical sides of third tongue member 20. In addition to pads 62, rails 63 are attached to the bottom of the external surface 174 of member 20 to further facilitate smooth sliding motion. Similarly, rails 80 are provided on the bottom external surface 164 of second tongue member 19 and shims 75a and bearing pads 75 are provided on each of the top external surface and the two vertical side external surfaces of second tongue member 19.

Referring to FIGS. 13, 20, 21, 23 and 24, bearing pad or aligning assemblies 54 (shown in an exploded view in FIG. 13) (which each also double as first extension stop members or assemblies) are positioned on the top and both vertical sides of second tongue member 19 and each include a bearing pad reinforcement plate 54a, a bearing pad 54b, shims 54d, retainer plates 54e and a plurality of bolts 54f. In addition, in FIGS. 20 and 21 a limiting member 54g is illustrated. Each of the bearing pad assemblies 54 is similarly constructed and therefore only one of the pad assemblies will be described in detail. Generally, the bearing pad reinforcement plate 54a is a square steel member which is welded or secured in some other manner to a corresponding external surface of member 19 at the second end 161 of member 19. A square opening 54c is cut into plate 54a and through an adjacent portion of second end 161. Composite bearing pad or bearing member 54b is dimensioned so as to be receivable within opening 54c. Where the assembly 54 includes a limiting member 54g the limiting member 54g and bearing pad 54b compliment each other and together fill the space defined by opening 54c with pad 54b facing the second end of tongue member 19 and member 54g facing away from the second end of member 19. Member 54b is formed of a wear resistant material while member 54g is formed of a rigid material.

With third tongue member 20 received inside the second passageway 162, composite bearing pads 54b are positioned in openings 54c so that internal surfaces thereof are very close to the external surface 174 of third tongue member 20. Shims 54d are provided on the outwardly facing surfaces of bearing pads 54b. Thereafter, retainer plates 54e are attached to the bearing pad reinforcement plates 54a with a plurality of bolts 54f.

Figure 20:
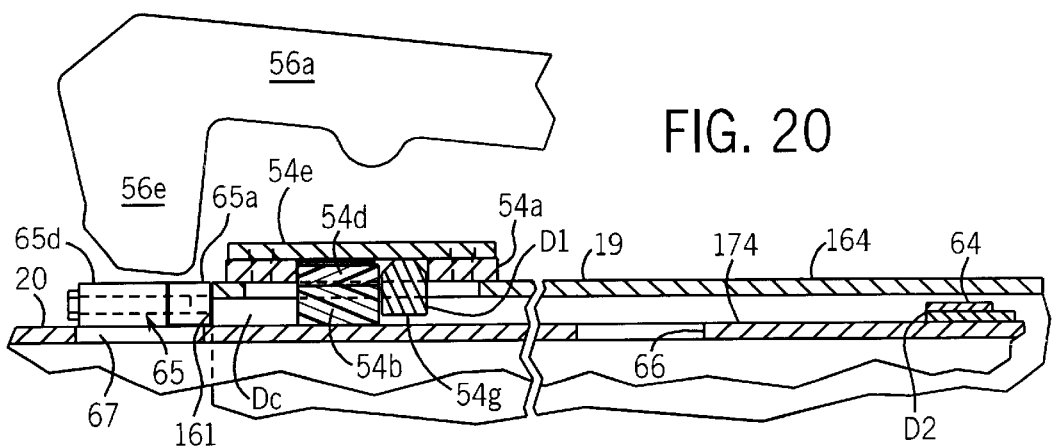
FIG. 20 is a cross-sectional view of the stops and latch slots taken along line 20—20 of FIG. 18, albeit with the latch in an unlatched position shown in the extended position.
Figure 21:
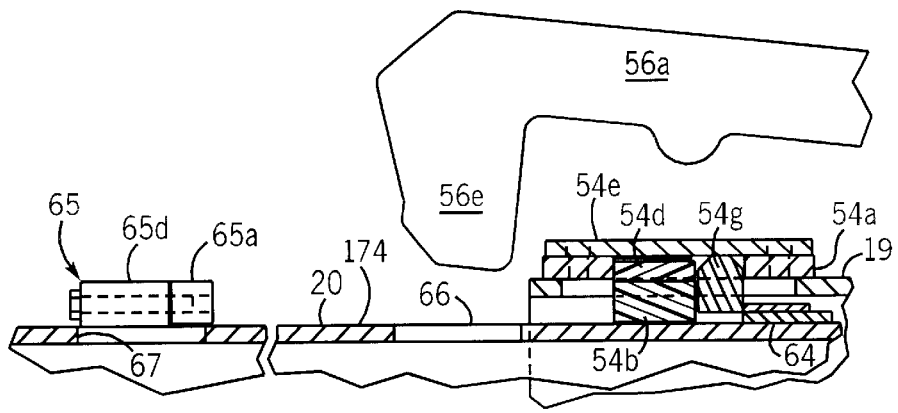
FIG. 21 is similar to FIG. 20, albeit taken along the line 21—21 of FIG. 22 with tongue members in an extended position.

Referring also to FIGS. 20 and 21, differently sized shims 54d can be swapped in and out of the assembly 54 until the spacing between external surface 174 and a corresponding facing pad 54b surface is ideal. The rectilinear limiting members 54g form first extension stop surfaces that face away from the second end of member 19 and that cooperate with other extension stop member surfaces (e.g., 64 in FIG. 21) on third tongue member 20 to limit extension of the third tongue member 20 from second tongue member 19 in a manner to be described below.

Figure 14:
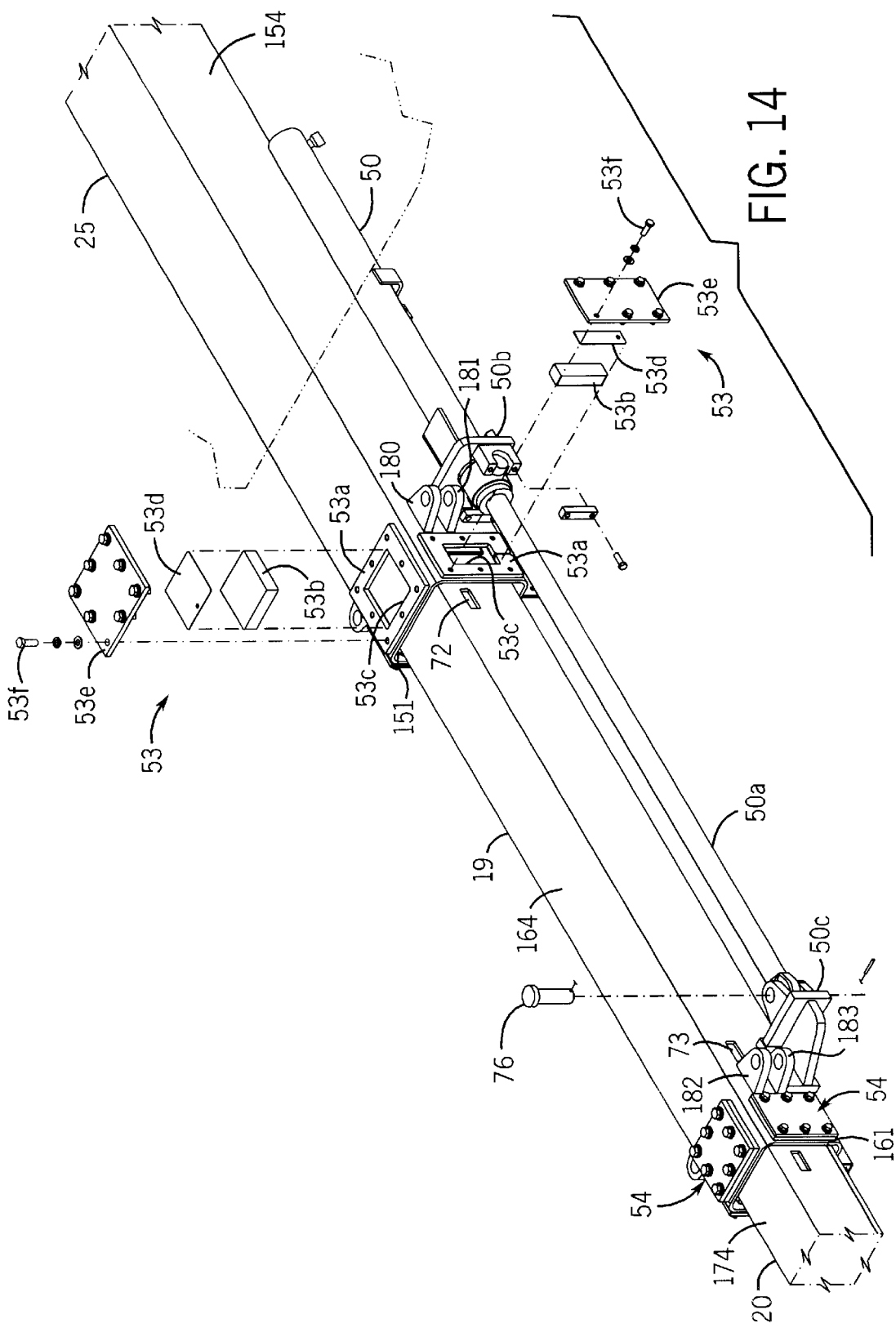
FIG. 14 is a partially exploded perspective view of the second and third tongue members of FIG. 13 and a first tongue member and external cylinder assembly.

Referring now to FIGS. 14 and 24, bearing assemblies 53 (that again also double as first extension stop members or assemblies) that are similar to the bearing assemblies 54 described above are also provided at the second end of first tongue member 25 on each of the vertical side walls and on the top wall to further facilitate smooth sliding of second tongue member 19 within first tongue member 25. Pad assemblies 53 are similar to the assemblies 54 described above and therefore will not be described again here in detail. It should suffice to say that each assembly 53 includes a bearing pad reinforcement plate 53a that receives a composite bearing pad 53b through an opening 53c and also includes shims 53d used to adjust spacing, that each assembly 53 may also include stop members (not illustrated) and that the shims 53d and pads 53b are held in place by retainer plates 53e and a plurality of bolts 53f.

Figure 12:
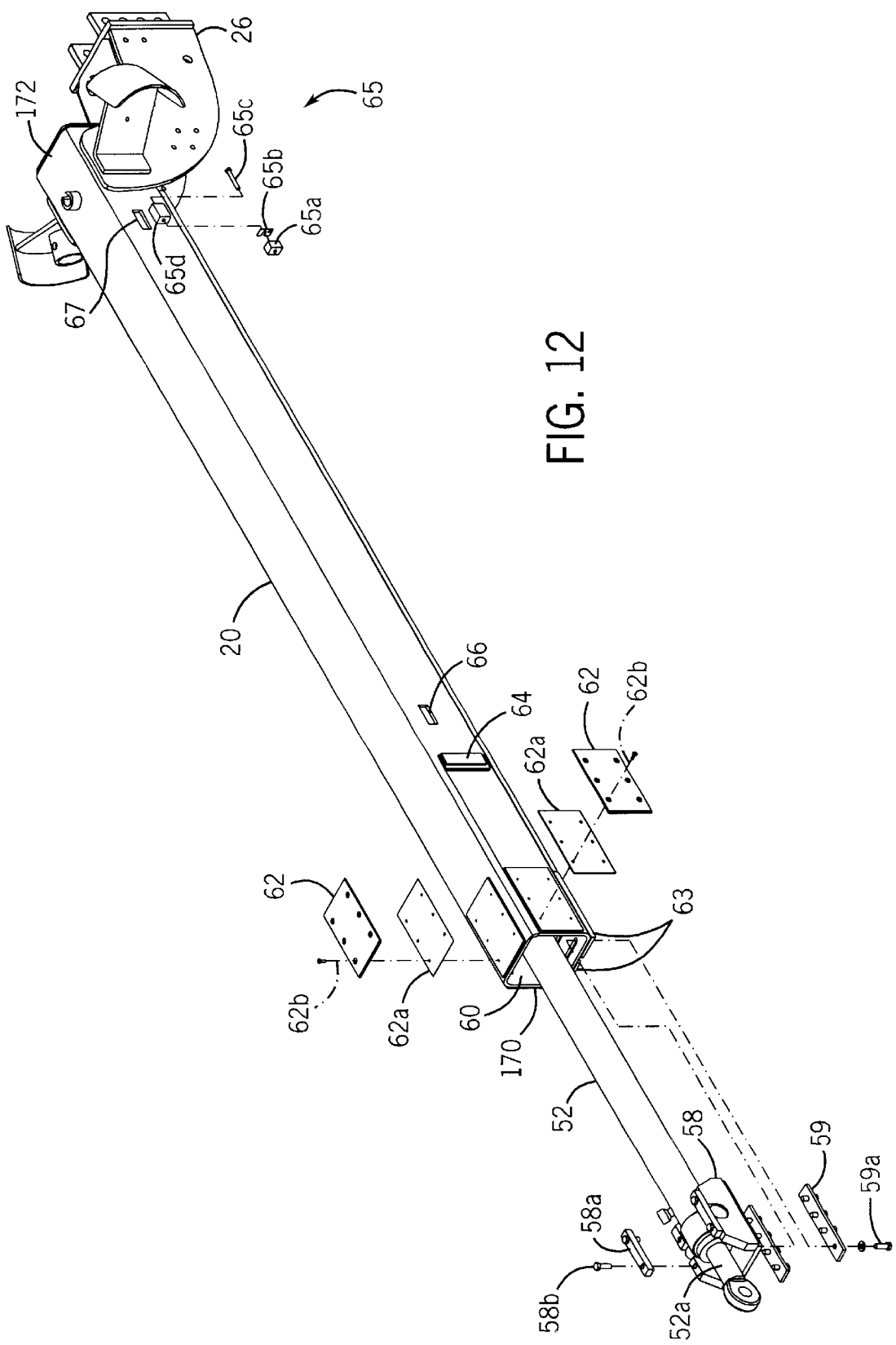
FIG. 12 is a partially exploded perspective view of a third tongue member and corresponding hydraulic cylinder rod and various assembly components.

Referring now to FIG. 12, third tongue member 20 forms a first pair of latch slots 66 (only one shown) proximate the first end of member 20, slots 66 formed in the opposing vertical side walls. Similarly, member 20 forms a second pair of latch slots or apertures 67 proximate the second end of member 67, a separate slot 67 formed in each of the vertical side walls of member 20. Furthermore, various stop members or stops are formed or secured to the vertical side wall external surfaces of member 20 to limit the maximum and minimum relative positions between members 19 and 20.

Figure 23:
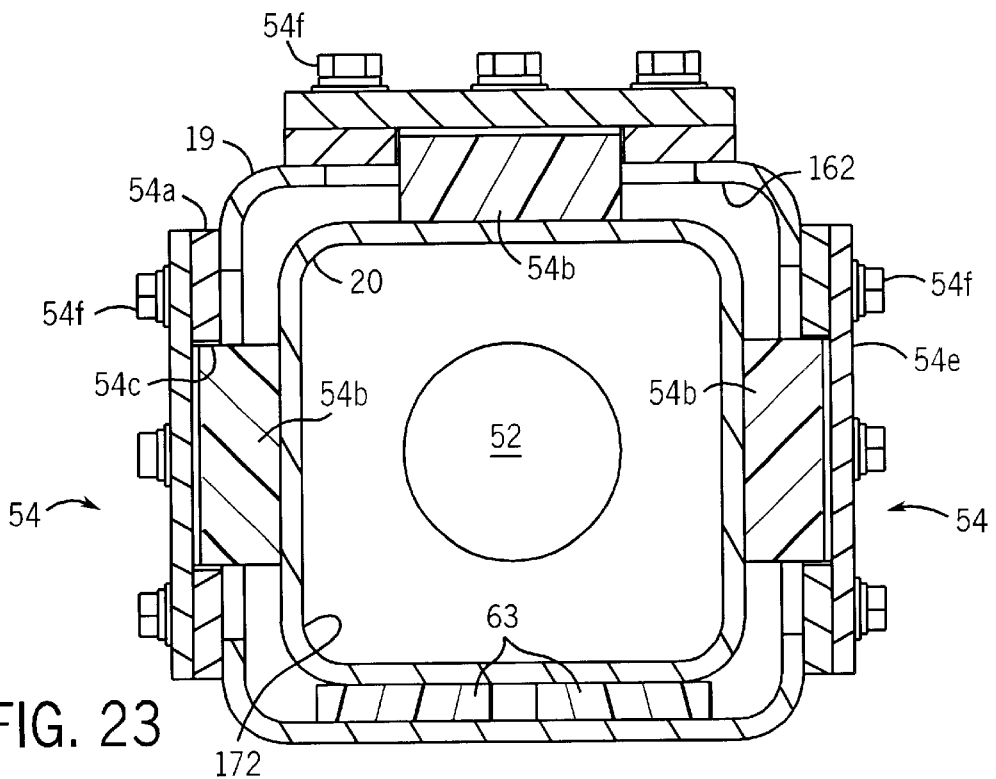
FIG. 23 is a cross-sectional view taken along line 23—23 of FIG. 16.

To this end, a pair of extension stops 64 (i.e., each being a second extension stop member or assembly) are attached to each vertical side wall of telescoping member 20 (only one stop 64 shown) proximate the first end 170 of member 20. As illustrated, each second extension stop member 64 is positioned between pad 62 and slot. Each second extension stop member 64 forms a second extension stop surface facing an adjacent slot 66. Referring to FIGS. 20, 21 and 23, with the clearance between adjacent internal and external surfaces of members 19 and 20, respectively, defining a clearance dimension Dc, the bearing pad 54b and member 54g extends first dimension D1 and member 64 extends a second dimension D2 from the external surface of member 20 where each of the first and second dimensions is less than the clearance dimension and the sum of the first and second dimensions is greater than the clearance dimension Dc such that, as seen in FIG. 21, when member 20 is extended from member 19, the maximum extension is limited by the stop surfaces.

Although not illustrated, each of the second extension stop members 64 can be detached from tongue member 20 and moved within a range along the length of member 20 between pad 62 and slot 66 such that the distance between the second extended stop surface on member 64 and the slot 66 can be adjusted. In at least one embodiment stop members 64 are secured to tongue member 19 via bolts (not illustrated). By making the position of members 64 adjustable, the positions of members 64 can be altered to make sure that when the first and second extension stop surfaces contact, end 55e of latch 55a is aligned with slot 66 as seen in FIG. 21. By providing adjustable stop members as described above, manufacturing tolerances for the tongue members and slots can be relaxed thereby reducing manufacturing costs.

In addition, retraction stop assemblies 65 are positioned on the external surfaces of each vertical side wall of member 20 (only one assembly 65 shown) proximate the second end of member 20. Assembly 65 includes a retraction stop 65a, a shim 65b, a bolt 65c and a stop mounting bracket 65d. Stop mounting bracket 65d is secured to its corresponding vertical side of member 20 just below slot 67. A mounting aperture (not separately numbered) extends through bracket 65d along a direction parallel to the length of tongue member 20. To secure stop 65a and shim 65b to bracket 65d, bolt 65c is placed through the aperture formed by the bracket 65d and is received by shim 65b and stop 65a in a threaded fashion.

Shims 65b come in various thicknesses (i.e., at least first and second thicknesses) and can be swapped in and out for each other to adjust relative positions of the first and second tongue members when the members are in the retracted position. This adjustability is important so that locking members described below can be aligned with latch slots 64 and 67 (see FIG. 12) to lock the assembly in various configurations as described in more detail below.

Figure 13:
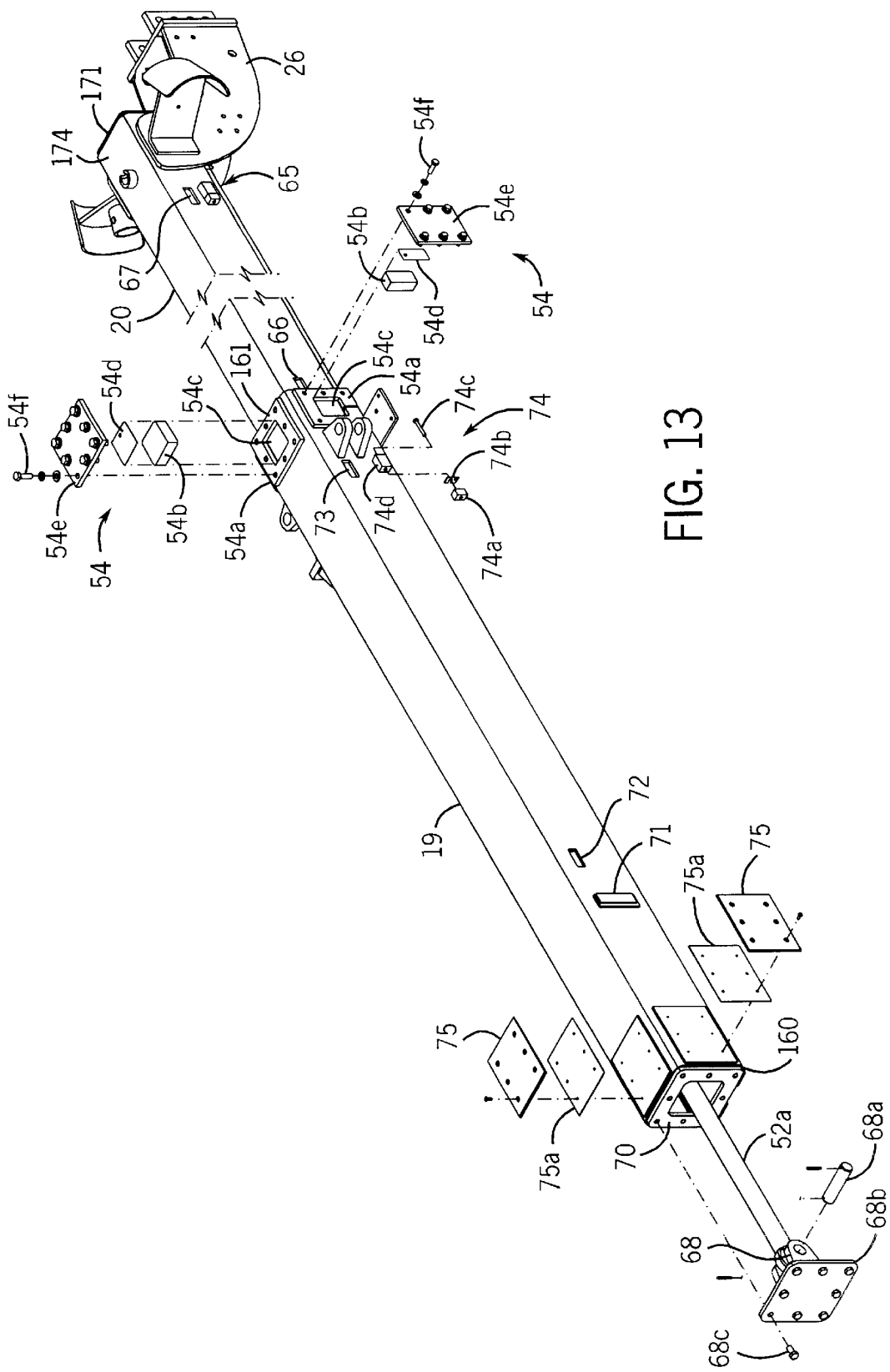
FIG. 13 is a partially exploded perspective view of the third tongue member of FIG. 12 and a second tongue member both that receives the third member and other assembly components.

Referring now to FIG. 13, second tongue member 19 forms first and second pairs of latching slots 72, 73 (only one slot of each pair is shown), respectively, that are similar to the slot pairs 66 and 67 illustrated in FIG. 12 and described above. To this end, the first slot pair 72 is provided with one slot in each of the vertical side walls proximate the first end of member 19 while pair 73 includes a separate slot 73 in each of the vertical side walls of member 19 at the second end of member 19. In addition, limiting means similar to limiting stops 64 and assemblies 65 illustrated in FIG. 12 are provided on the vertical side wall external surfaces of member 19 including a pair of extension stops 71 and a pair of retraction stop assemblies 74 mounted at the first and second ends of member 19, respectively. Assemblies 74 are similar to assembly 65 described above and therefore will not be described here in detail. Suffice it to say that each assembly 74 includes each of a retraction stop 74a, a shim 74b, a screw 74c and a mounting bracket 74d. Operation of the stops, stop assemblies, latch slots and additional latching components will be described in greater detail below.

Referring once again to FIGS. 12, 18 and 22–24, first cylinder 50 includes a rod 50a that extends therefrom to a distal end and is double acting meaning that the cylinder 50 is plumbed so that the rod 50a can be forced to either extend or retract. Similarly, second cylinder 52 includes a rod 52a having a distal end and that is double acting. Second hydraulic cylinder 52 is generally mounted within the third passageway 172 formed by third tongue member 20. To this end, a cylinder mounting bracket 58 is secured to cylinder 52 and is mounted to the internal surface that forms passageway 172 adjacent an opening 60 of member 20 at the first end 170 thereof. The bracket 58 is mounted to the internal surface of passageway 172 via a plurality of bolts 59a. Spacers 59 may be provided between bracket 58 and the internal surface of passageway 172 to center rod 52a within passageway 172. 58a and 58b secure the internal cylinder 52 to the bracket 58.

Referring now to FIGS. 12 and 13, with third tongue member 20 received inside the second passageway 162 formed by second tongue member 19 and the distal of end rod 52*a* extending from the first end 160 of second tongue member 19, a square end plate 68*b* can be secured to the distal end of rod 52*a* via a clevis 68 and corresponding pin 68*a*. Thereafter, end plate 68*b* is secured to the first end 160 of second tongue member 19. In the exemplary and illustrated embodiment, a square end plate 70 is provided on first end 160 which can be used to connect end plate 68*b* thereto via bolts 68*c*. Thus, it should be appreciated that when rod 52*a* is extended, third tongue member 20 is forced out the second end 161 of member 19 thereby extending the subassembly including members 19 and 20.

Referring now to FIG. 14, first cylinder 50 is generally mounted to the external surface 154 of first tongue member 24 via bracket 50*b* proximate the second end 151 of member 24 so that the distal end of rod 50*a* extends past second end 151. The distal end of rod 50*a* is secured proximate the second end 161 of second tongue member 19 between assembly 54 and slot 73. As above, the distal end of rod 50*a* can be secured via a clevis 50*c* and pin 76. Thus, it should be appreciated that when rod 50*a* is extended, cylinder 50 forces second tongue member 19 from within first tongue member 25 thereby extending the subassembly including members 19 and 25.

More broadly, referring now to FIGS. 10–14, 18 and 22, it should be appreciated that by placing at least one of the hydraulic cylinders outside the passageways formed by the expandable tongue members, at least a two stage tongue assembly 18 can be configured wherein the cylinders have dedicated spaces and do not interfere with each other. Thus, upon retraction and as illustrated best in FIG. 18, cylinder 52 essentially completely occupies passageway 172 but, nevertheless, cylinder 50 can be accommodated outside the tongue member defined passageways. Importantly, providing the configuration illustrated where cylinder 50 is "off-load" centered is only a viable option once it is recognized that, by providing multiple cylinders, the load on each cylinder, including off-load center cylinders (e.g., 50), is substantially reduced. Thus, because the load on the externally mounted cylinder is reduced by providing several cylinders, an overall cylinder life cycle comparable to prior single stage cylinder life cycles can be achieved.

Figure 10:
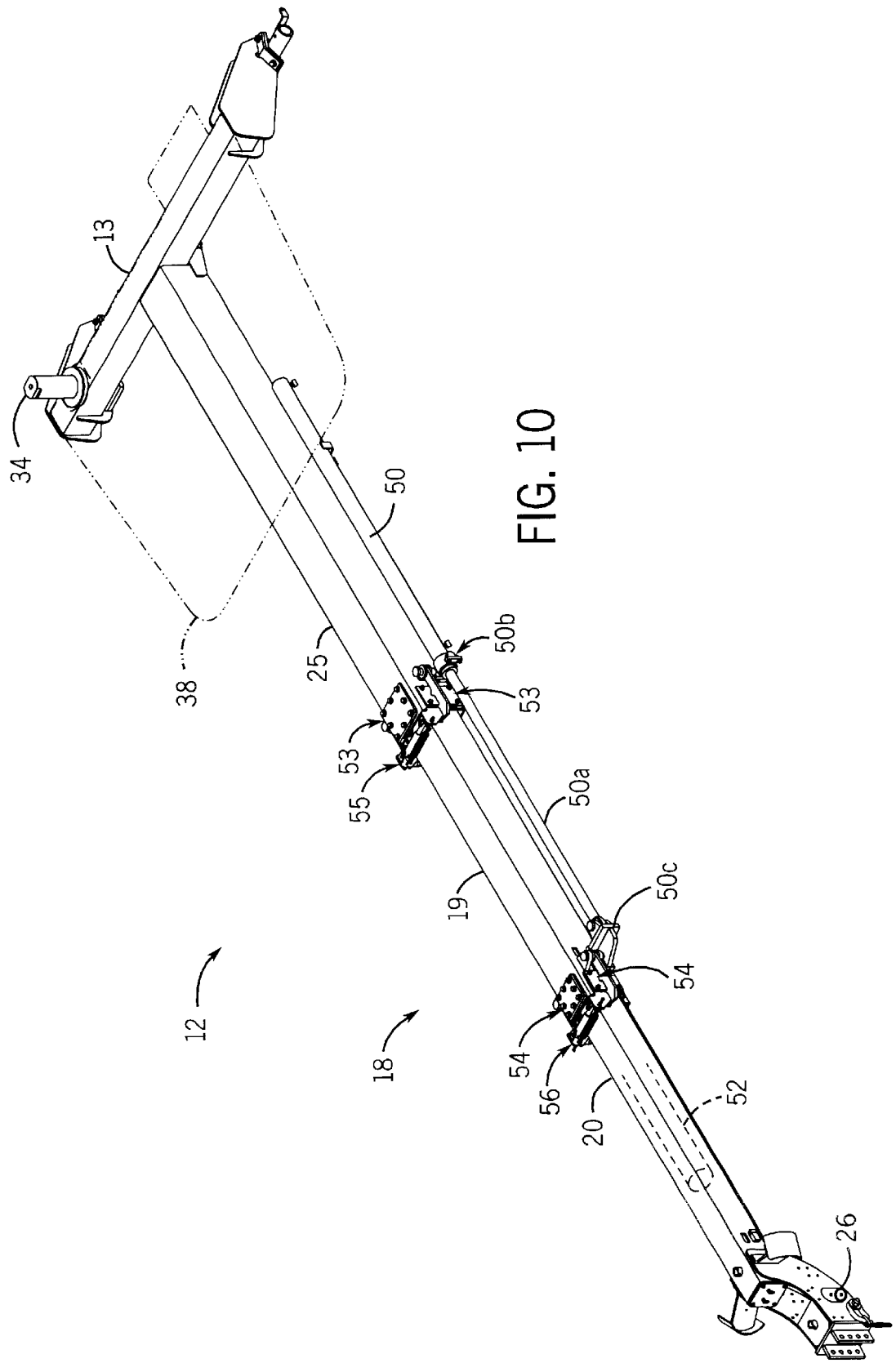
FIG. 10 is a perspective view of components that, in part, form the carrier frame assembly used with the configuration of FIG. 1 in an extended or transport position.

Referring now to FIG. 10, it should also be appreciated that additional stages may be added to tongue assembly 18 by providing additional externally located hydraulic cylinders, a separate cylinder for each of the additional stages. For example, in FIG. 10 if a fourth stage were added, the third hydraulic cylinder may be secured to the top external surface of second tongue member 19 with the additional tongue member positioned between members 19 and 20. Additional stages are contemplated by providing additional hydraulic cylinders on other sides of the tongue assembly 18.

Referring to FIGS. 12, 13, 14, 18 and 22, it should also be appreciated that when third tongue member 20 is retracted into second tongue member 19, the second end 161 of second tongue member 19 abuts stop assemblies 65 and retraction movement is limited thereby. Similarly, when second tongue members 20 is retracted into first tongue member 25, the second end 151 of first tongue member 25 abuts stop assembly 74 and retraction movement is limited thereby.

Moreover, referring also to FIGS. 20 and 21, it should be appreciated that when third tongue member 20 is extended from second tongue member 19, eventually stop members 64 contacts stop member 54*g* and extension movement is limited thereby. Similarly, although not illustrated, member 71 (see FIG. 13) a stop member similar to member 54*g* cooperate to limit extension of second tongue member 19 from first tongue member 25.

Referring now to FIG. 14, in additional to the components described above that form parts of first and second tongue members 25 and 19, respectively, latch mounting extensions for mounting locking latches that cooperate with the latch slots (e.g., 73, 72, etc.) described above are provided at the second ends 151 and 161 of tongue member 25 and 19, respectively. More specifically, referring also to FIGS. 15–17 a first latch mounting assembly includes first and second outwardly extending members 180 and 181 that are positioned adjacent assembly 53 on the vertical side wall of tongue member 25 to which hydraulic cylinder 50 is attached. Extensions 180 and 181 have vertically aligned openings (not numbered) and define a space therebetween for receiving a latch member 55*a* (see FIG. 15). Similar latch mounting extensions extend from the other vertical wall of tongue member 24 for receiving a second latch member 55*a* that can be seen in FIG. 16.

Figure 16:
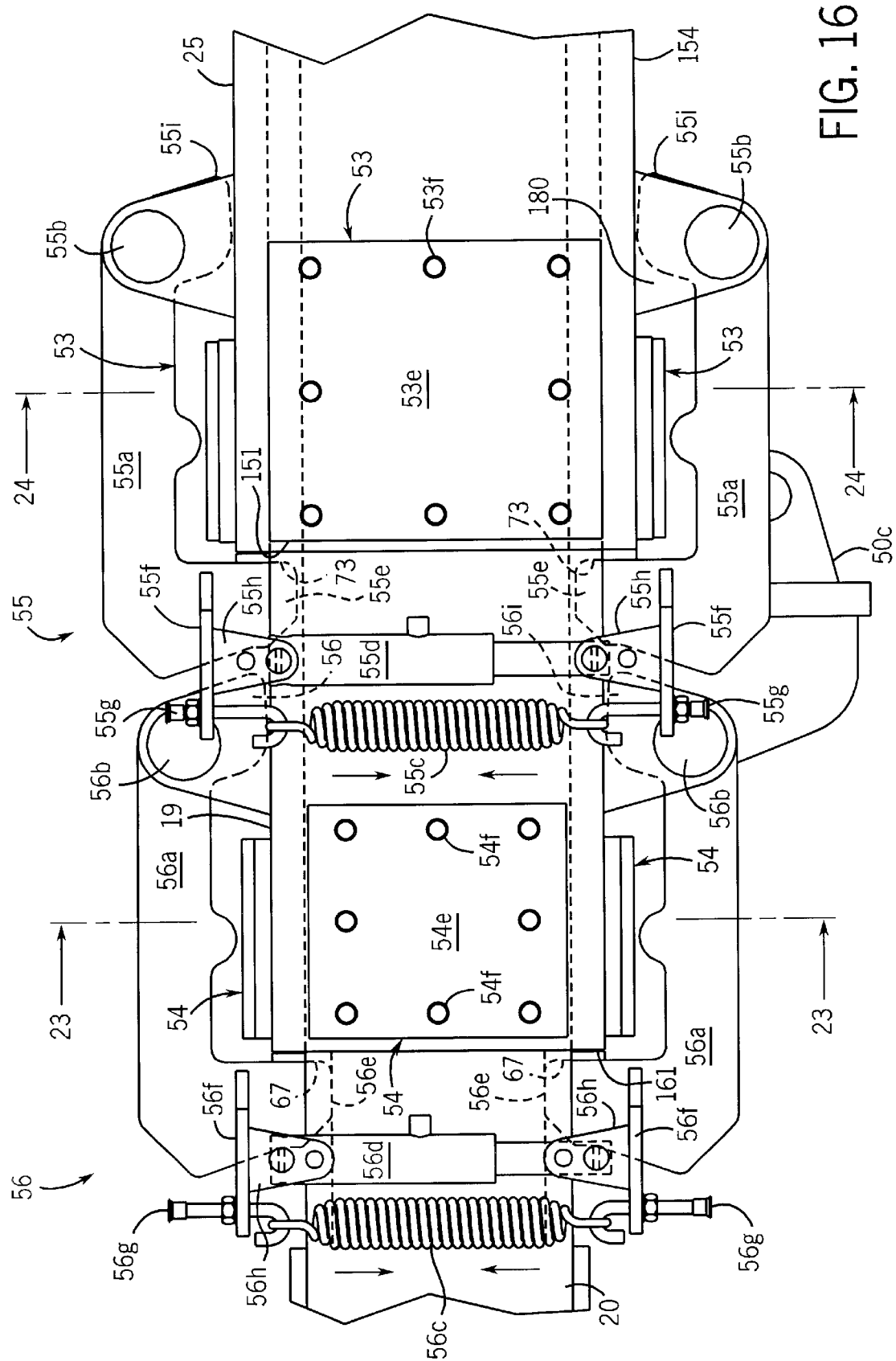
FIG. 16 is a top plan view of the latch assemblies of FIG. 15 in a latched position.
Figure 17:
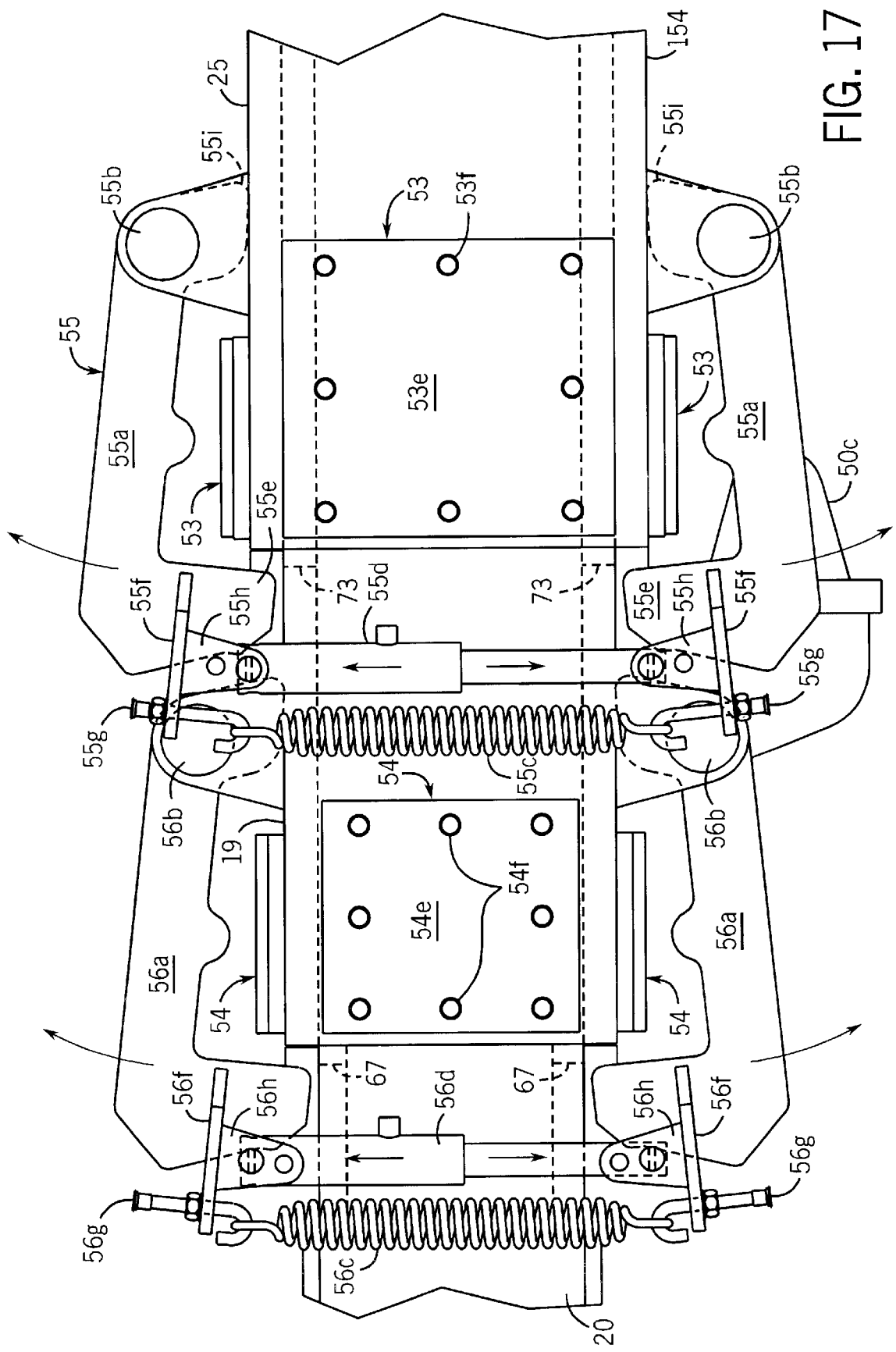
FIG. 17 is similar to FIG. 16, albeit with the latch assemblies in an unlatched position.

Referring still to FIG. 14, two latch mounting members 182 and 183 extend outwardly from the vertical side wall to which the distal end of rod 50*a* is attached proximate second end 161 of member 19. Members 182 and 183, like member 180 and 181 form openings that are vertically aligned and form a space therebetween for receiving a latch member 56*a* as illustrated in FIGS. 16 and 17. Once again, latch mounting members like members 182 and 183 are provided on the other vertical side wall of second tongue member 19.

Importantly, when second member 19 is received within first member 25, the space defined by members 180 and 181 is aligned with each of slots 72 and 73 defined by second tongue member 19. Similarly, the space defined by the mounting members extending from the other vertical side wall of first tongue member 25 are similarly aligned with latch slots formed in the other vertical side wall of member 19. Moreover, the spaces defined by member 182 and 183 and similar members extending from the other side wall of member 19 are aligned with latch receiving slots formed by third tongue member 20 (e.g., see slots 67 and 72).

Figure 15:
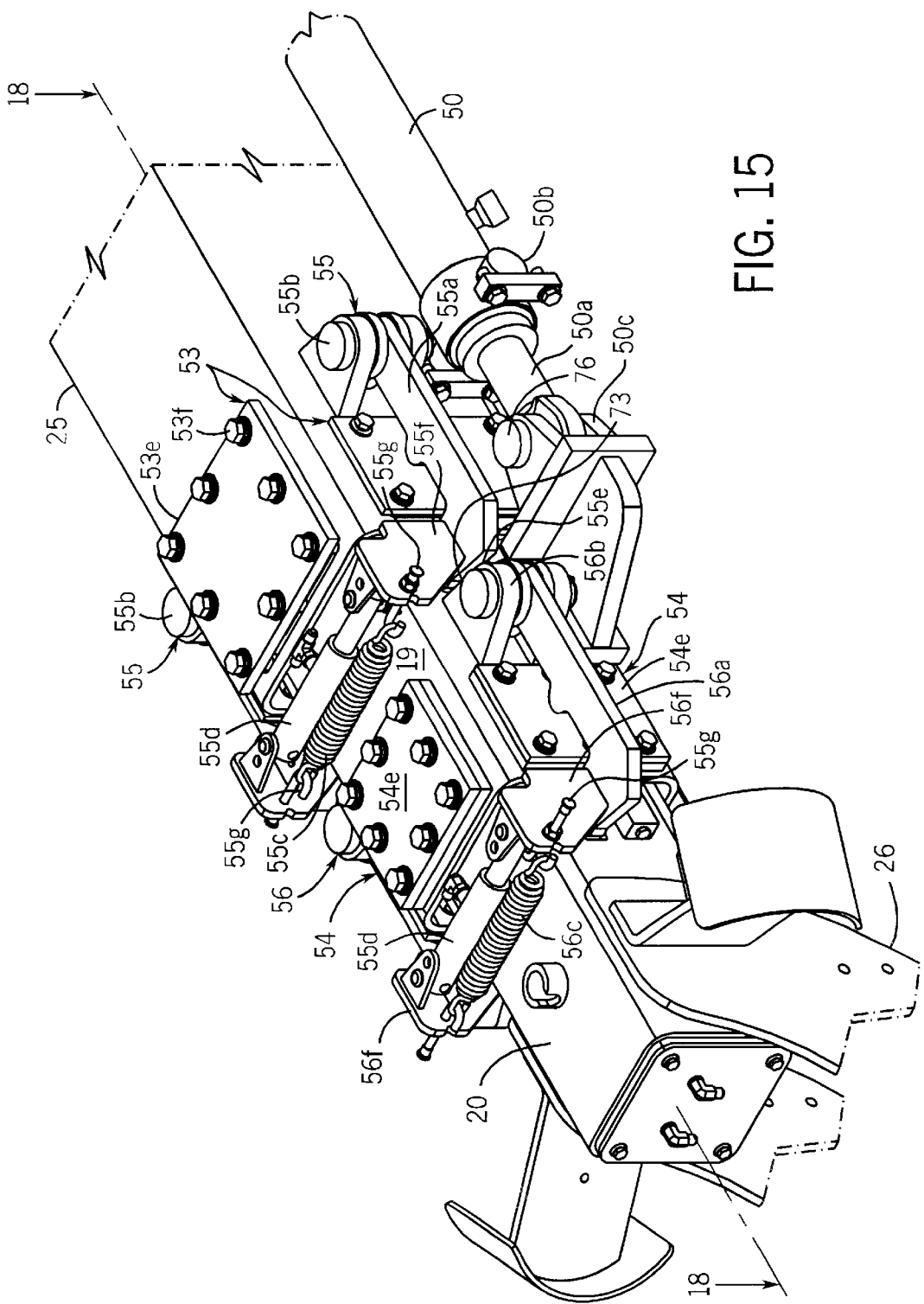
FIG. 15 is a detailed perspective view of a portion of the hitch assembly of FIG. 11 with the tongue members in the retracted position.

Referring now to FIGS. 12–22, and more specifically referring to FIG. 15, two separate latch assemblies 55 and 56 are illustrated that are mounted to the second ends 151 and 161 of the first and second tongue members 25 and 19, respectively. Generally speaking, each of the latch assemblies 55 and 56 is similarly constructed and operates is similar fashion and therefore, in the interest of simplifying this explanation, only latch assembly 55 will be described here in detail. To this end, latch assembly 55 includes first and second latches 55*a*, pivot pins 55*b*, a biasing spring 55*c*, a one-way hydraulic cylinder 55*d* and first and second extension plates 55*f*. Each of the latches 55*a*, pins 55*b* and plates 55*f* are similar in construction and operation and therefore, unless indicated otherwise, only one of each of those components will be described here.

Referring still to FIG. 15 and, more specifically, the latch 55*a* illustrated therein, and, also referring to the same latch 55*a* in FIG. 17, latch 55*a* has several components including a body component identified by number 55*a*, a latch tip 55*e* and a latch stop 55*i*. Tip 55*e* and stop 55*i* are integral with base member 55*a* and extend to the same side thereof, tip 55*e* extending a greater distance than stop 55*i*. At the junction between stop 55*i* and base member 55*a*, an opening (not numbered) is provided through which a bolt or securing pin 55b can be passed when latch 55a is mounted between mounting members 180 and 181 (see also FIG. 14).

Plate 55f is a flat member that is secured to latch tip 55e about half-way along the length of tip 55e and extends at a right angle thereto. A cylinder mounting member 55h extends in the same direction as tip 55e from the top end of plate 55f. An adjustable J hook 55g is mounted proximate the top end of plate 55f so that the hook member extends in the direction that member 55h extends (i.e., in the direction of tip 55e).

Referring still to FIGS. 14–17, latch 55a is dimensioned such that when latch 55a is mounted between extensions 180 and 181 via bolt or pin 55b with member 55a extending toward second tongue member 19, tip 55e extends past second end 151 of first tongue member 25. Plate 55f is dimensioned such that the top end of plate 55f extends above second tongue member 19 and so that when a spring 55c is mounted between opposed J hooks 55g and when cylinder 55d is mounted between members 55h, each of the spring 55c and cylinder 55d clear the top wall of second tongue member 19. Stop 55i is dimensioned such that, when latch 55a is mounted between members 180 and 181, while latch 55a can rotate about pin 55b, after a small rotational arc, stop 55i contacts the external surface of first tongue member and further rotation is limited.

As indicated above, the second latch assembly 56 is similar in form and function to assembly 55 except that assembly 56 is mounted to the second end 161 of second tongue assembly 19 so that latch tips extend past second end 161. To this end, assembly 56 includes third and fourth latch members 56a, pins 56b, spring 56c, latch hydraulic cylinder 56d, plates 56f, J hooks 56g and extensions 56h. Each latch 56a has a base member, a stop 56i and a latch tip 56e, the base member, stop and tip configured in a manner essentially identical to the latches 55a described above.

Referring still to FIGS. 16 and 17, in operation, with the latch cylinders 55d and 56d retracted, corresponding latches 55a and 56a are pulled inwardly by springs 55c and 56c as illustrated in FIG. 16. Referring also to FIG. 18, when the tongue assemblies 19 and 20 are in their retracted positions, latch tips 55e and 56e are aligned with latch slots 73 and 67 (see also FIGS. 13 and 14) and are received therein. However, when latch cylinders 55d and 56d are extended, the cylinders overcome the force of springs 55c and 56c driving latch tips 55e and 56e from slots 73 and 67, respectively. This extended latch cylinder position is illustrated in FIG. 17. When the latch assemblies 55 and 56 are in their extended or unlocked positions, tongue mounted cylinders 50 and 52 may be extended to drive second and third tongue members 19 and 20 in to their extended positions as illustrated in FIG. 22. Once members 29 and 20 are in their extended positions, latch cylinders 55d and 56d may be "de-energized" so that they are compressed by the force of springs 55c and 56c thereby causing latch tips 55e to be received within recesses 72 and 66, respectively.

Figure 19:
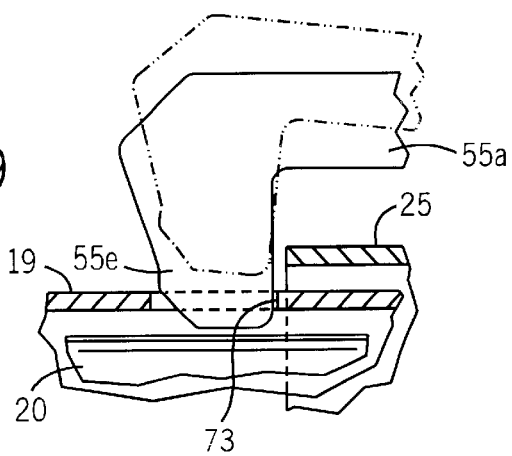
FIG. 19 is a cross-sectional view of a latch taken along the line 19—19 of FIG. 18.

Referring to FIG. 19, movement of latch tip 55e from aperture 73 is illustrated. In FIG. 20, movement of latch tip 56e from aperture 67 is illustrated. In FIG. 21, alignment of latch tip 56e with slot 66 after extension of third tongue member from second tongue member 19 is illustrated.

Referring again to FIGS. 12, 13 and 14, shims 65b and 74b and other components that comprise assemblies 54 and 53 can be adjusted to aid in aligning the latch tips 55e and 56e with corresponding latch slots (e.g., 66, 67, etc.).

Figure 25:
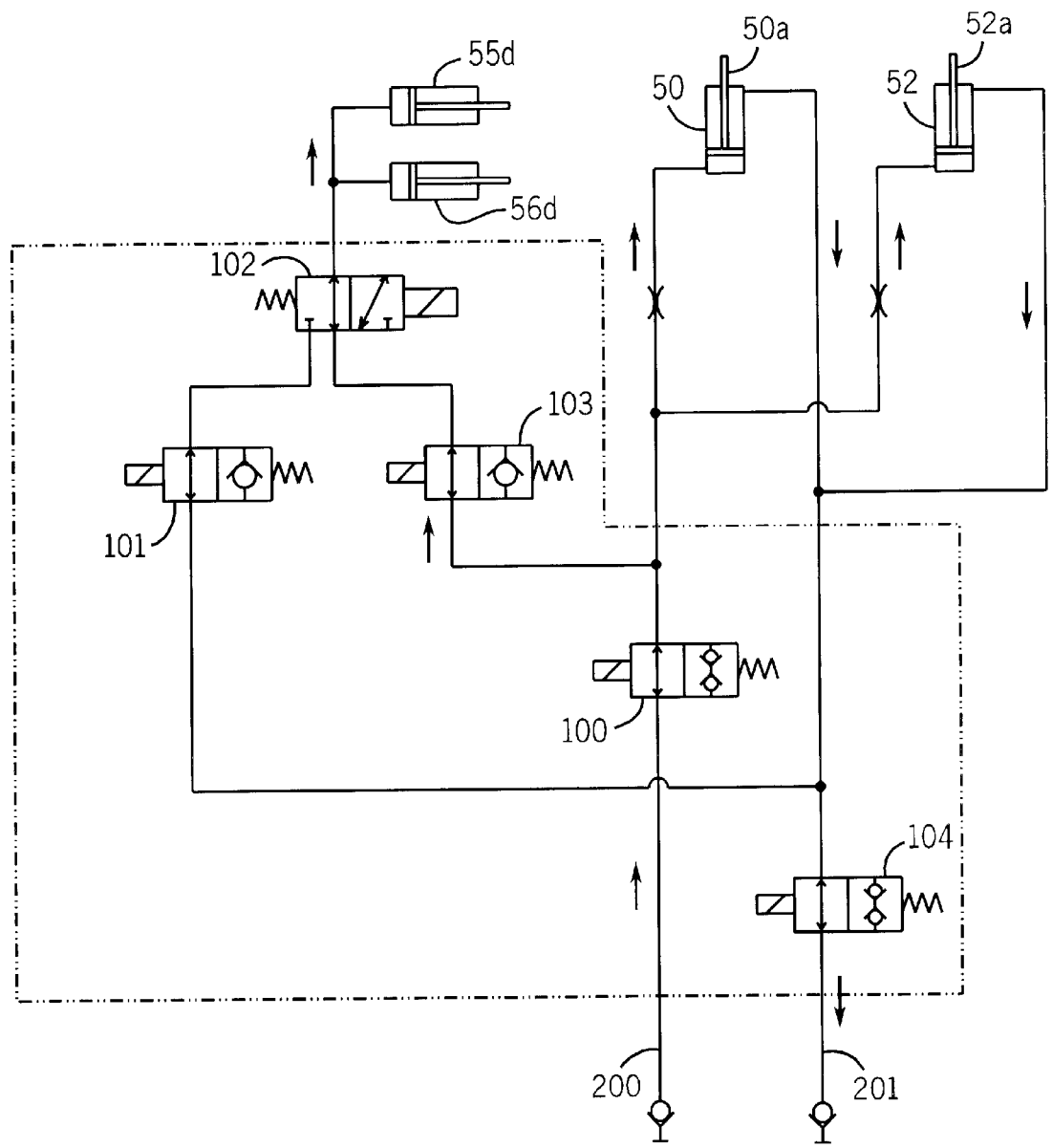
FIG. 25 is a schematic diagram of a hydraulic control assembly used to control the configuration of FIG. 1 at an instant in time when each of the latch and tongue cylinder rods are being driven toward extended positions.

Referring now to FIG. 25, an exemplary schematic diagram illustrating the plumbing used to link each of the latch cylinders 55d and 56d and the first and second tongue cylinders 50 and 52 is illustrated. While not illustrated, a hydraulic reservoir and pump is linked to first and second hydraulic system ports 200 and 201, respectively. The pump is capable of pumping hydraulic fluid in either direction through the illustrated system. The system includes five solenoid controlled valves 100, 101, 102, 103 and 104, cylinders 55d, 56d, 50 and 52 (including rods 50a and 52a) and a plurality of hydraulic lines that link the system together. Port 200 is linked to valve 100 which in turn is linked to extension ports of each of the first and second tongue cylinders 50 and 52, respectively. Each of cylinders 50 and 52 is an orificed two-way hydraulic cylinder and therefore also includes a retract port. Each retract port is linked to valve 104 which in turn leads to port 201. Thus, cylinders 50 and 52 are linked in parallel in the illustrated system.

Referring still to FIG. 25, the output of valve 100 is also linked to valve 103 and the output of valve 103 is linked to a first of two inputs of two-way solenoid valve 102. Similarly, the output of value 104 is linked to the input of solenoid valve 101 and the output valve 101 is linked to the second input of two-way value 102. The single output of valve 102 is linked to each of non-orificed one-way cylinders 55d and 56d. Thus, each of cylinders 55d and 56d are in parallel with cylinders 50 and 52. Orificed cylinders are simply cylinders that, as the label implies, bleed off some hydraulic fluid when first driven to change rod position whereas non-orificed cylinders have no bleeding characteristics and therefore top-out or reach their extended positions relatively quickly. Thus, because all four cylinders 55d, 56d, 50 and 52 are linked in parallel, when hydraulic fluid is provided through either of valve 100 or 104, the fluid first causes cylinders 55d and 56d to completely top-out and thereafter causes movement in cylinders 50 and 52 to move rods 50a and 52a, respectively.

Figure 26:
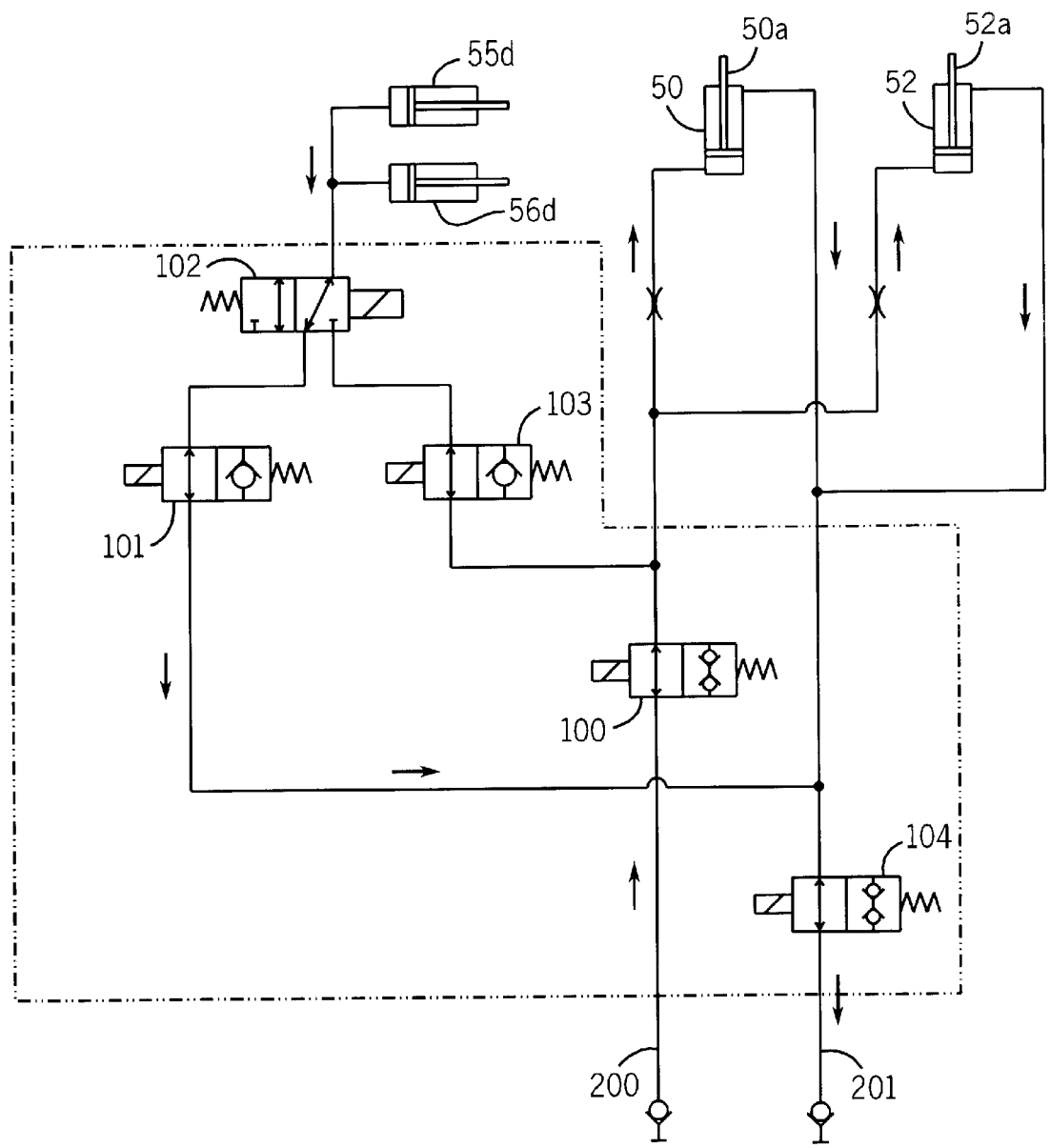
FIG. 26 is similar to FIG. 25, albeit at an instant in time when the tongue cylinder rods are being driven toward the extended position and with the latch cylinder pressure released so that the latches are forced into locking positions.

Referring still to FIG. 25 and also to FIG. 16, assuming that tongue assembly 18 is in a completely retracted and locked position, in order to unlock the latch assemblies 55 and 56 and extend assembly 18, hydraulic fluid is pumped into the system via port 200 with each of valves 100, 101, 103 and 104 open and with valve 102 open and linking valve 103 to cylinders 55d and 56d. In this case, because cylinders 55d and 56d are not orificed, the fluid causes cylinders 55d and 56d to top-out and completely extend overcoming the force of springs 55c and 56c to drive latches 55a and 56a to the unlocked positions illustrated in FIG. 17. Thereafter, after cylinders 55b and 56b top out, the fluid being pumped into port 200 is provided to cylinders 50 and 52 thereby causing those cylinders to extend and drive corresponding tongue members toward the extended positions. Upon reaching the extended positions, stop members 64, 71 and members 54g limit further extension (e.g., see FIG. 21) with latch tips 55e and 56e aligned with slots 72 and 66 (see FIGS. 12 and 13), respectively. Thereafter, referring to FIG. 26, with valve 101 open, the two-way valve solenoid is energized to switch valve 102 thereby linking cylinders 55d and 56d through valves 101 and 104 to port 201 so that springs 55c and 56c force the hydraulic fluid from cylinders 55b and 56b, respectively and latches 55a and 56a and their corresponding tips are forced into locking positions engaging recesses 72 and 76, respectively.

Figure 27:
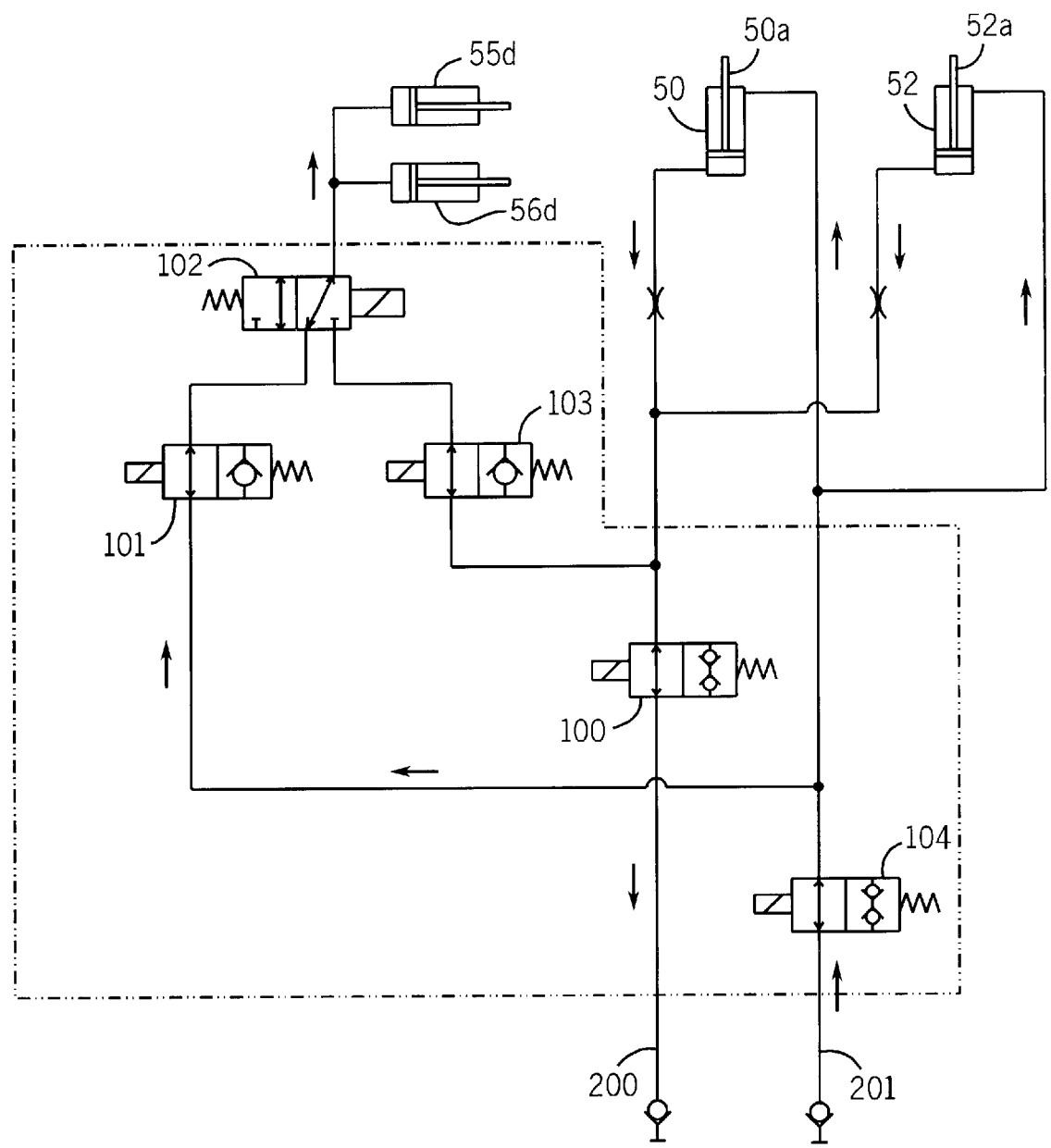
FIG. 27 is similar to FIG. 25, albeit at an instant in time when each of the latch cylinder rods is being driven toward the extended position and when each of the tongue cylinder rods is being driven toward the retracted position.
Figure 28:
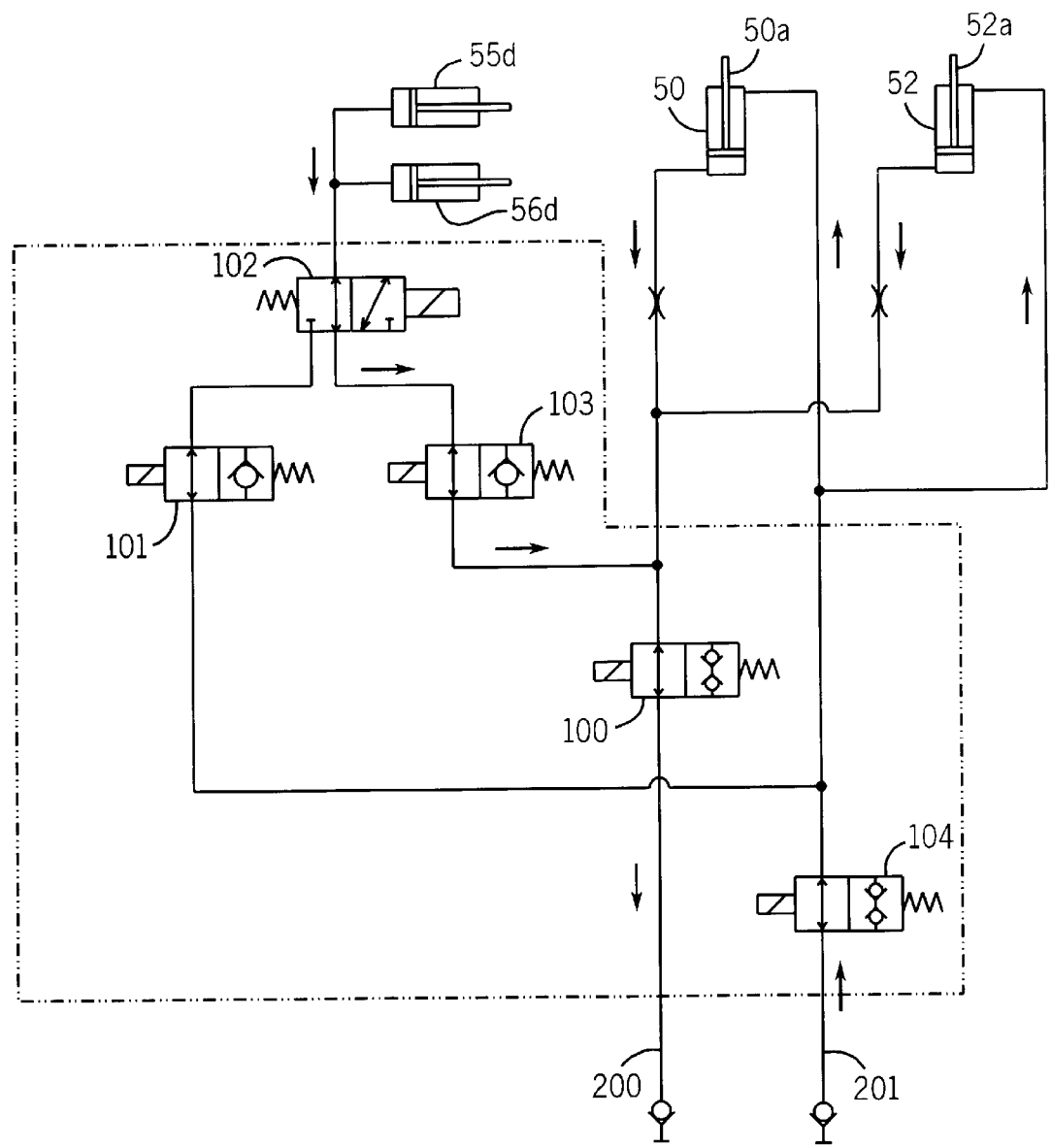
FIG. 28 is similar to FIG. 26, albeit at an instant in time when the tongue cylinder rods are being driven toward the retracted position and with the latch cylinder pressure released so that the latches are forced into locking positions.

Referring now to FIG. 27, to reverse the process described above, with valves 100, 101, 103 and 104 open and valve 102 linking cylinders 55d and 56d to valve 101, hydraulic fluid is pumped into the system via port 201. The fluid is provided through valves 104, 101 and 102 to cylinders 55d and 56d to, once again, drive the latches 55a and 56a into unlocked positions. Once cylinders 55b and 56b have topped off, fluid is provided to cylinders 50 and 52 thereby driving rods 50a and 52a toward retracted positions and thus causing tongue members 20 and 19 to retract into corresponding passageways. After the completely retracted positions have been achieved and tongue member ends 151 and 161 abut stop assemblies 74 and 65, respectively, referring to FIG. 28, the valve solenoid corresponding to valve 102 is energized to link cylinders 55d and 56d to open valve 103 thereby allowing the latch springs 55c and 56c to force liquid from valves 55d and 56d which exits port 200. Thus, the latch springs 55c and 56c again drive latch tips 55e into slots 73 and 67, respectively.

While the drawings, specific examples, and particular formations given describe exemplary embodiments, they serve the purpose of illustration only. The materials and configurations shown and described may differ depending on the chosen performance characteristics and physical characteristics of the planter equipment. For example, the type of planter equipment may differ. In addition, while a two stage configuration is illustrated, configurations including many more stages are contemplated where externally mounted cylinders are disposed on the various sides of the tongue assembly. Moreover, an embodiment where all cylinders are externally disposed is contemplated. Furthermore, other locking mechanisms are contemplated for use with the inventive apparatus. Thus, the systems shown and described are not limited to the precise details and conditions disclosed. Furthermore, other substitutions, modifications, changes, and omissions may be made in the design, operating conditions, and arrangement of the exemplary embodiments without departing from the spirit of the invention as expressed in the appended claims.

What is claimed is:

1. An extendable apparatus for securing an agricultural implement to a hitch receiving member of a vehicle, the apparatus comprising:

a first elongated tongue member having a first external surface and forming a first passageway;

a second elongated tongue member having a second external surface, forming a second passageway and slidably mounted within the first passageway, the first and second tongue members being a first tongue pair;

a third elongated tongue member having a third external surface, forming a third passageway and slidably mounted within the second passageway, the second and third tongue members being a second tongue pair, one of the first and third tongue members mounted to the implement;

a first tongue cylinder including a first rod member mounted within a first base member and having a first distal end, the first base member and first distal end secured to separate ones of the first tongue pair members such that when the first rod member is extended the second tongue member extends from the first passageway and when the first rod member is retracted the second tongue member is substantially received within the first passageway; and a second tongue cylinder including a second rod member mounted within a second base member and having a second distal end, the second base member and second distal end secured to separate ones of the second tongue pair members such that when the second rod member is extended the third tongue member extends from the second passageway and when the second rod member is retracted the third tongue member is substantially received within the second passageway;

wherein at least one of the first and second cylinders is secured to the external surfaces of a tongue pair.

2. The apparatus of claim 1 wherein the first base member and the first distal end are secured to the external surfaces of the first tongue pair.

3. The apparatus of claim 2 wherein the first base member is secured to the external surface of the first tongue member and the first distal end is secured to the external surface of the second tongue member.

4. The apparatus of claim 3 wherein each of the first and second tongue members has first and second ends and wherein, when the second tongue member is substantially received within the first passageway, the first end of the second tongue member is proximate the first end of the first tongue member and when the second tongue member is extended from the first passageway, the first end of the second tongue member is proximate the second end of the first tongue member, the first distal end secured to the second tongue member proximate the second end of the second tongue member.

5. The apparatus of claim 4 wherein the second tongue cylinder is mounted inside the third passageway.

6. The apparatus of claim 5 wherein each of the second and third tongue members has first and second ends and wherein, when the third tongue member is substantially received within the second passageway, the first end of the third tongue member is proximate the first end of the second tongue member and when the third tongue member is extended from the second passageway, the first end of the third tongue member is proximate the second end of the second tongue member, the second distal end secured to the second tongue member proximate the first end of the second tongue member.

7. The apparatus of claim 1 wherein the second tongue cylinder is mounted inside one of the first and third passageways.

8. The apparatus of claim 7 wherein the second tongue cylinder is mounted inside the third passageway.

9. The apparatus of claim 8 wherein each of the second and third tongue members has first and second ends and wherein, when the third tongue member is substantially received within the second passageway, the first end of the third tongue member is proximate the first end of the second tongue member and when the third tongue member is extended from the second passageway, the first end of the third tongue member is proximate the second end of the second tongue member, the second distal end secured to the second tongue member proximate the first end of the second tongue member.

10. The apparatus of claim 1 wherein the tongue members together form a tongue assembly having an external assembly surface and each of the first and second tongue cylinders is secured to the assembly surface.

11. The apparatus of claim 10 wherein the first tongue cylinder is secured to a first side of the assembly surface and the second tongue cylinder is secured to a second side of the assembly surface and wherein the second side is different than the first side.

12. The apparatus of claim 1 wherein the first tongue member is mounted to the implement.

13. The apparatus of claim 1 wherein the first and second tongue cylinders are plumbed in parallel.

14. The apparatus of claim 1 further including a first locking assembly mounted to one of the first tongue pair members and operable to lock the first tongue pair members in at least one of a retracted and an extended position and also including a second locking assembly mounted to one of the second tongue pair members and operable to lock the second tongue pair members in at least one of a retracted and an extended position.

15. The apparatus of claim 14 wherein the first locking assembly is operable to lock the first tongue pair members in each of the extended and retracted positions and the second locking assembly is operable to lock the second tongue pair members in each of the extended and retracted positions.

16. The apparatus of claim 15 wherein each of the first and second tongue members has first and second ends and wherein, when the second tongue member is in the retracted position, the first end of the second tongue member is proximate the first end of the first tongue member and when the second tongue member is in the extended position, the first end of the second tongue member is proximate the second end of the first tongue member, the first locking assembly including at least a first arm member, a first spring member and a first locking cylinder, the first arm member pivotally mounted to the external surface of the first tongue member and having a first locking end that extends past the second end of the first tongue member and toward the second tongue member, the first spring member secured proximate the first locking end to pull the first locking end toward the second tongue member, the first locking cylinder secured proximate the first locking end such that when a first locking cylinder rod is extended, the first locking end is forced away from the second tongue member, the second tongue member forming first and second slots proximate the first and second ends of the second tongue member, respectively, for receiving the first locking end when the second tongue member is in the retracted and extended positions, respectively.

17. The apparatus of claim 16 wherein the first locking assembly further includes a second arm member pivotally mounted to the external surface of the first tongue member on a side of the first tongue member opposite the first arm member and having a second locking end that extends past the second end of the first tongue member and toward the second tongue member, the first spring member further secured proximate the second locking end to pull the second locking end toward the second tongue member, the first locking cylinder further secured proximate the second locking end such that when the first locking cylinder rod is extended, the second locking end is forced away from the second tongue member, the second tongue member forming third and fourth slots proximate the first and second ends of the second tongue member, respectively, for receiving the second locking end when the second tongue member is in the retracted and extended positions, respectively.

18. The apparatus of claim 17 wherein each of the second and third tongue members has first and second ends and wherein, when the third tongue member is in the retracted position, the first end of the third tongue member is proximate the first end of the second tongue member and when the third tongue member is in the extended position, the first end of the third tongue member is proximate the second end of the second tongue member, the second locking assembly including third and fourth arm members, a second spring member and a second locking cylinder, the third and fourth arm members pivotally mounted to opposite sides of the external surface of the second tongue member and having third and fourth locking ends that extend past the second end of the second tongue member and toward the third tongue member, respectively, the second spring member secured proximate the third and fourth locking end to pull the third and fourth locking ends toward the third tongue member, the second locking cylinder secured proximate the third and fourth locking ends such that when a second locking cylinder rod is extended, the third and fourth locking ends are forced away from the third tongue member, the third tongue member forming fourth and fifth slots proximate the first and second ends of the third tongue member, respectively, for receiving the third locking end when the third tongue member is in the retracted and extended positions, respectively, and also forming sixth and seventh slots proximate the first and second ends of the third tongue member, respectively, for receiving the forth locking end when the third tongue member is in the retracted and extended positions, respectively.

19. The apparatus of claim 18 wherein the locking cylinders are plumbed in parallel with the first and second tongue cylinders.

20. The apparatus of claim 19 wherein the first and second cylinders are orificed.

21. An extendable apparatus for securing an agricultural implement to a hitch receiving member of a vehicle, the apparatus comprising:

a first elongated tongue member having a first external surface and first and second ends, forming a first passageway and mounted to the implement;

a second elongated tongue member having a second external surface and first and second ends, forming a second passageway and slidably mounted within the first passageway for movement between a retracted position where the first end of the second tongue member is proximate the first end of the first tongue member and an extended position wherein the first end of the second tongue member is proximate the second end of the first tongue member;

a third elongated tongue member having a third external surface and first and second ends, forming a third passageway and slidably mounted within the second passageway for movement between a retracted position where the first end of the third tongue member is proximate the first end of the second tongue member and an extended position wherein the first end of the third tongue member is proximate the second end of the second tongue member;

a first tongue cylinder including a first rod member mounted within a first base member and having a first distal end, the first base member mounted to the external surface of the first tongue member and first distal end secured proximate the second end and to the external surface of the second tongue member such that when the first rod member is extended the second tongue member is moved into the extended position and when the first rod member is retracted the second tongue member is moved into the retracted position; and a second tongue cylinder including a second rod member mounted within a second base member and having a second distal end, the second base member mounted within the second passageway and the second distal end secured proximate the first end of the second tongue member such that when the second rod member is extended the third tongue member moves into the extended position and when the second rod member is retracted the third tongue member is moved into the retracted position.

22. An extendable apparatus for securing an agricultural implement to a hitch receiving member of a vehicle, the apparatus comprising:

a first elongated tongue member having a first external surface and first and second ends, forming a first passageway and mounted to the implement;

a second elongated tongue member having a second external surface and first and second ends, forming a second passageway and slidably mounted within the first passageway for movement between a retracted position where the first end of the second tongue member is proximate the first end of the first tongue member and an extended position wherein the first end of the second tongue member is proximate the second end of the first tongue member, the first and second tongue members being a first tongue pair;

a third elongated tongue member having a third external surface and first and second ends, forming a third passageway and slidably mounted within the second passageway for movement between a retracted position where the first end of the third tongue member is proximate the first end of the second tongue member and an extended position wherein the first end of the third tongue member is proximate the second end of the second tongue member, the second and third tongue members being a second tongue pair;

a first locking assembly mounted to one of the first tongue pair members and operable to lock the first tongue pair members in each of a retracted and an extended position; and a second locking assembly mounted to one of the second tongue pair members and operable to lock the second tongue pair members in each of a retracted and an extended position.

23. The apparatus of claim 22 wherein the first locking assembly includes first and second arm members, a first spring member and a first locking cylinder, the first and second arm members pivotally mounted on opposite sides of the external surface of the first tongue member and having first and second locking ends that extends past the second end of the first tongue member and toward the second tongue member, the first spring member secured proximate the first and second locking ends to pull the first and second locking ends toward the second tongue member, the first locking cylinder secured proximate the first and second locking ends such that when a first locking cylinder rod is extended, the first and second locking ends are forced away from the second tongue member, the second tongue member forming first and second slots proximate the first and second ends of the second tongue member, respectively, for receiving the first locking end when the second tongue member is in the retracted and extended positions, respectively, the second tongue member also forming third and fourth slots proximate the first and second ends of the second tongue member, respectively, for receiving the second locking end when the second tongue member is in the retracted and extended positions, respectively, and the second locking assembly includes third and fourth arm members, a second spring member and a second locking cylinder, the third and fourth arm members pivotally mounted on opposite sides of the external surface of the second tongue member and having third and fourth locking ends that extends past the second end of the second tongue member and toward the third tongue member, the second spring member secured proximate the third and fourth locking ends to pull the third and fourth locking ends toward the third tongue member, the second locking cylinder secured proximate the third and fourth locking ends such that when a second locking cylinder rod is extended, the third and fourth locking ends are forced away from the third tongue member, the third tongue member forming fifth and sixth slots proximate the first and second ends of the third tongue member, respectively, for receiving the third locking end when the third tongue member is in the retracted and extended positions, respectively, the third tongue member also forming seventh and eighth slots proximate the first and second ends of the third tongue member, respectively, for receiving the fourth locking end when the third tongue member is in the retracted and extended positions, respectively.

24. The apparatus of claim 23 further including first and second tongue cylinders, the first tongue cylinder mounted to the first tongue pair to drive the first pair members between the extended and retracted positions and the second tongue cylinder mounted to the second tongue pair to drive the second pair members between the extended and retracted positions.

25. The apparatus of claim 24 wherein the locking cylinders and the first and second tongue cylinders are plumbed in parallel and wherein the tongue cylinders are orificed.

* * * * *